United States Patent
Ohtsu et al.

(10) Patent No.: US 11,266,280 B2
(45) Date of Patent: Mar. 8, 2022

(54) DUST REMOVING DEVICE AND DUST REMOVING SYSTEM

(71) Applicant: SMC CORPORATION, Chiyoda-ku (JP)

(72) Inventors: Yoshifumi Ohtsu, Yokohama (JP); Toru Nakayama, Soka (JP); Shigeyuki Eguchi, Koshigaya (JP); Koichi Konno, Moriya (JP); Junichi Inaba, Joso (JP); Akio Saitoh, Koshigaya (JP); Koji Sugano, Koshigaya (JP); Yosuke Shirai, Toride (JP); Masayoshi Yamamoto, Koshigaya (JP)

(73) Assignee: SMC CORPORATION, Chiyoda-ku (JP)

( * ) Notice: Subject to any disclaimer, the term of this patent is extended or adjusted under 35 U.S.C. 154(b) by 287 days.

(21) Appl. No.: 16/346,993

(22) PCT Filed: Apr. 6, 2017

(86) PCT No.: PCT/JP2017/014362
§ 371 (c)(1),
(2) Date: May 2, 2019

(87) PCT Pub. No.: WO2018/083822
PCT Pub. Date: May 11, 2019

(65) Prior Publication Data
US 2020/0069123 A1 Mar. 5, 2020

(30) Foreign Application Priority Data
Nov. 4, 2016 (JP) .............................. JP2016-216242

(51) Int. Cl.
*A47L 5/14* (2006.01)
*B23Q 11/00* (2006.01)
*B08B 5/00* (2006.01)

(52) U.S. Cl.
CPC . *A47L 5/14* (2013.01); *B08B 5/00* (2013.01); *B23Q 11/006* (2013.01); *B23Q 11/0075* (2013.01)

(58) Field of Classification Search
CPC ... B23Q 11/00; B23Q 11/006; B23Q 11/0075; B23Q 11/005; A47L 5/14; B08B 5/00;
(Continued)

(56) References Cited

U.S. PATENT DOCUMENTS

| | | | |
|---|---|---|---|
| 6,170,758 B1 * | 1/2001 | Lee | B23Q 11/006 239/124 |
| 7,520,020 B1 * | 4/2009 | Hutchens | B08B 5/02 15/304 |

(Continued)

FOREIGN PATENT DOCUMENTS

| | | |
|---|---|---|
| CN | 205639954 U | 10/2016 |
| EP | 0 029 980 A2 | 6/1981 |

(Continued)

OTHER PUBLICATIONS

Indian Office Action dated Nov. 27, 2020 in Indian Patent Application No. 201947021674 (with English translation), 4 pages.
(Continued)

*Primary Examiner* — Katina N. Henson
(74) *Attorney, Agent, or Firm* — Oblon, McClelland, Maier & Neustadt, L.L.P.

(57) ABSTRACT

A needle screw fitted to a compressed fluid supply part that is provided on a nozzle main body of a dust removing device adjusts the jet flow rate of a first compressed fluid from a jet nozzle by adjusting the flow path area of a first fluid supply path. Meanwhile, the suction flow rate of a second compressed fluid to be discharged into a discharge flow path is adjusted by adjusting the flow path area of a second fluid supply path by turning a nozzle main body-side adjustment
(Continued)

screw that is provided on the nozzle main body and a suction nozzle-side adjustment screw that is provided on a suction nozzle.

16 Claims, 26 Drawing Sheets

(58) Field of Classification Search
CPC . B08B 5/02; B23B 47/34; B05B 1/005; Y10S 239/22
USPC ............... 15/345, 405; 239/291; 134/137
See application file for complete search history.

(56) References Cited

U.S. PATENT DOCUMENTS

| | | | |
|---|---|---|---|
| 7,562,414 B2 * | 7/2009 | Oh | ............... A47L 9/2868 15/339 |
| 2014/0082865 A1 | 3/2014 | Takayanagi | |

FOREIGN PATENT DOCUMENTS

| | | | | |
|---|---|---|---|---|
| EP | 0029980 A2 | * | 6/1981 | ......... B23Q 11/0075 |
| GB | 1 560 235 A | | 1/1980 | |
| GB | 1560235 A | * | 1/1980 | ............... B08B 5/04 |
| JP | 2004-33841 A | | 2/2004 | |
| JP | 2004-243209 A | | 9/2004 | |
| JP | 2005-153039 A | | 6/2005 | |
| JP | 2005153039 A | * | 6/2005 | |
| JP | 2008-259812 A | | 10/2008 | |
| JP | 2012208741 A | * | 10/2012 | |
| JP | 2015-13229 A | | 1/2015 | |
| JP | 2015-208741 A | | 11/2015 | |
| JP | 2015208741 A | * | 11/2015 | ............... B08B 5/02 |
| KR | 20 2012 101776 U1 | | 7/2012 | |

OTHER PUBLICATIONS

Extended European Search Report dated Aug. 7, 2020 in Patent Application No. 17867411.5, 12 pages.
Extended European Search Report dated Jan. 15, 2020 in Patent Application No. 15190796.1, 12 pages.
International Search Report dated Jun. 20, 2017 in PCT/JP2017/014362 filed on Apr. 6, 2017.
Korean Office Action dated Aug. 21, 2020 in Korean Patent Application No. 10-2019-7016042 (with English translation), 13 pages.
Combined Chinese Office Action and Search Report dated Mar. 1, 2021 in Chinese Patent Application No. 201780067087.6 (with partial English translation), 11 pages.

* cited by examiner

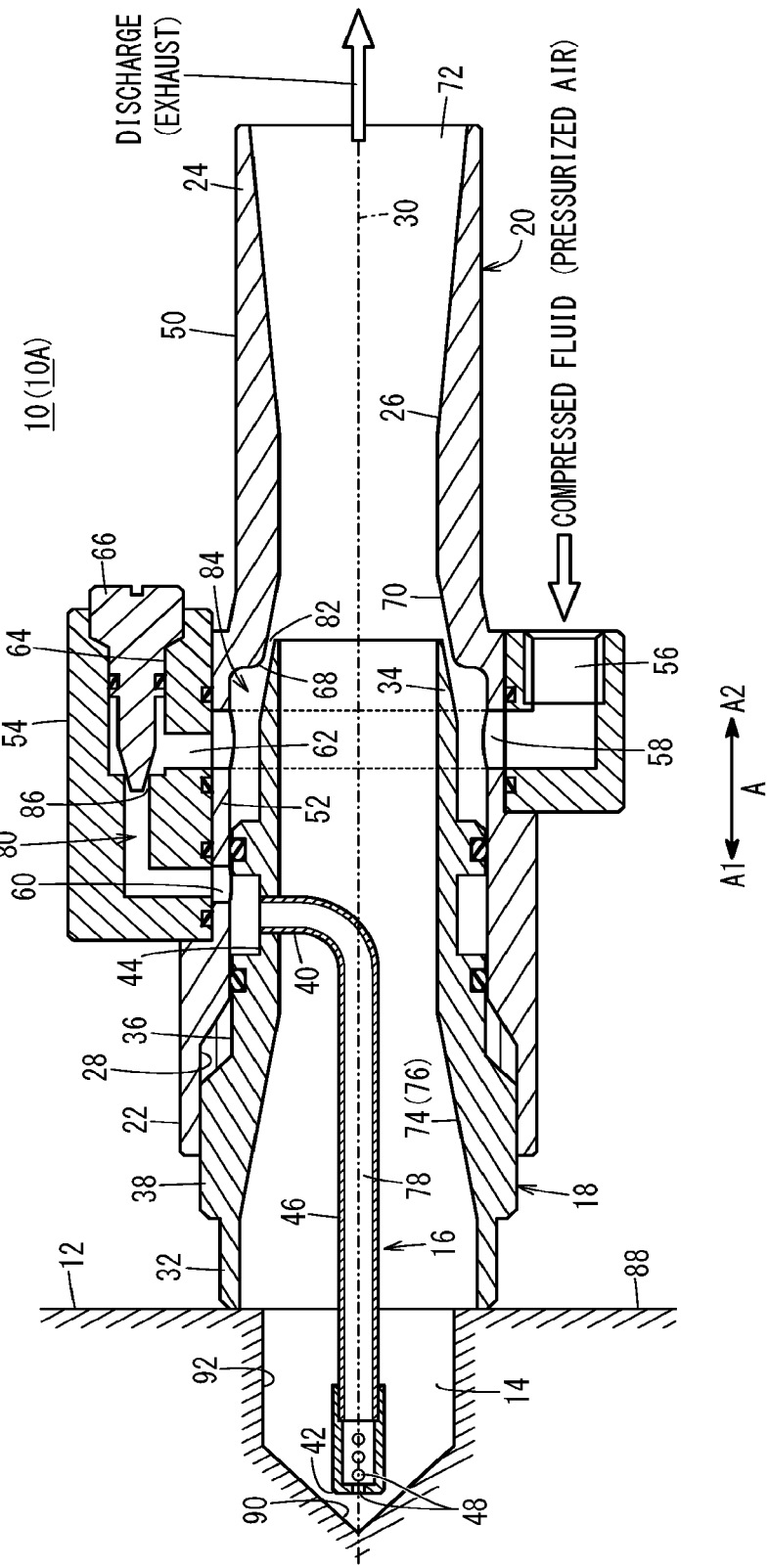

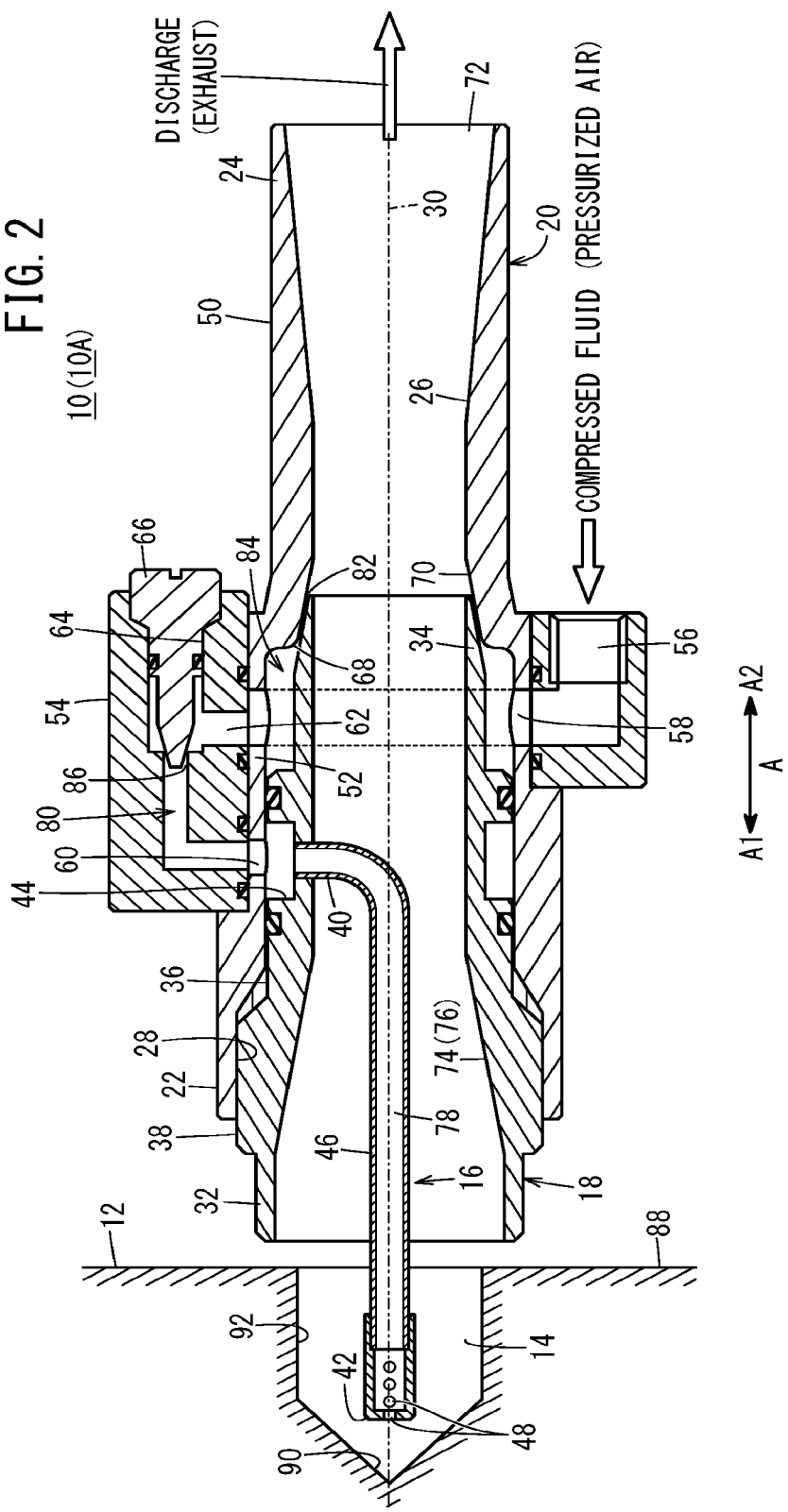

DUST REMOVING DEVICE AND DUST REMOVING SYSTEM

TECHNICAL FIELD

The present invention relates to a dust removing device configured to eject compressed fluid from a jet nozzle into a hole formed in an object and, at the same time, suction dust adhering to the hole and the compressed fluid by using a suction nozzle enclosing the jet nozzle in a state that the jet nozzle is inserted in the hole and the hole is closed by the suction nozzle, and relates to a dust removing system including the dust removing device.

For example, Japanese Laid-Open Patent Publication Nos. 2005-153039, 2004-033841, 2004-243209, and 2015-013229 disclose devices for removing dust such as chips and foreign substances adhering to holes formed in objects.

Japanese Laid-Open Patent Publication No. 2005-153039 discloses a machined hole cleaning device for ejecting pressurized air (compressed fluid) from a jet pipe (jet nozzle) while the jet pipe is inserted into a machined hole after cutting and the machined hole is closed by a hollow member (suction nozzle) enclosing the jet pipe, to thereby cause chips and foreign substances accumulated in the machined hole to float, and then discharge the floating chips and the pressurized air via the hollow member by vacuuming.

Japanese Laid-Open Patent Publication Nos. 2004-033841 and 2004-243209 each disclose a hand-held cleaner for blowing off dust and the like by ejecting compressed air (compressed fluid) while a tip nozzle (jet nozzle) is slightly separated from the surface of a mechanical part (object) and suctioning the dust and the like from a suction port of a tip suction pipe (suction nozzle) enclosing the tip nozzle by using a vacuum pressure.

Japanese Laid-Open Patent Publication No. 2015-013229 discloses a dust collection cleaning device in which a double walled pipe is inserted into a cut hole formed in a concrete wall (object), and compressed air (compressed fluid) is ejected from an ejection port of an outer pipe (jet nozzle), whereby clean outside air is introduced into the cut hole, while dust is suctioned from a tip of an inner pipe (suction nozzle).

SUMMARY OF INVENTION

Dust such as chips adhering to a hole formed in an object cannot be efficiently removed only by ejecting compressed fluid at a positive pressure from a jet nozzle to the dust. It is necessary that the dust should be suctioned via a suction nozzle by forming an air flow at a negative pressure by vacuum suction while the dust adhering to the hole is made to float by ejecting the compressed fluid.

It is expected that the dust adhering to the hole can be efficiently removed by a dust removing device provided with a flow rate adjustment mechanism for appropriately adjusting the ejection flow rate of the compressed fluid ejected from a jet nozzle to the hole and the suction flow rate at which the dust is suctioned via the suction nozzle by using vacuum suction.

However, the techniques disclosed in Japanese Laid-Open Patent Publication Nos. 2005-153039 and 2015-013229 cannot achieve efficient dust removal since the cleaning devices are not equipped with the above-described flow rate adjustment mechanism.

The techniques disclosed in Japanese Laid-Open Patent Publication Nos. 2004-033841 and 2004-243209 allow adjustment of the flow rate of the compressed air ejected from the tip nozzle using a flow control valve. However, the hand-held cleaners are not equipped with a mechanism to adjust the suction volume from the tip suction pipe.

In this manner, conventional dust removing devices including a jet nozzle and a suction nozzle do not include a flow rate adjustment mechanism adjusting the ejection flow rate and the suction flow rate. Thus, dust adhering to a hole cannot be efficiently removed.

The present invention has been devised taking into consideration the aforementioned problems, and has the object of providing a dust removing device and a dust removing system capable of efficiently removing dust adhering to a hole in an object.

The present invention relates to a dust removing device configured to eject compressed fluid from a jet nozzle into a hole of an object and suction dust adhering to the hole and the compressed fluid by using a suction nozzle enclosing the jet nozzle, in a state that the jet nozzle is inserted into the hole and the hole is closed by the suction nozzle, and further relates to a dust removing system including the dust removing device.

To achieve the above-described object, the dust removing device includes a hollow nozzle body to which the jet nozzle and the suction nozzle are connected and through which the dust and the compressed fluid suctioned by the suction nozzle are discharged to an outside, an ejection volume adjustment part configured to adjust a flow rate of the compressed fluid ejected from the jet nozzle, and a suction volume adjustment part configured to adjust an amount of the dust and an amount of the compressed fluid suctioned by the suction nozzle.

In this case, the nozzle body includes a first fluid supply route along which part of the compressed fluid supplied from the outside is supplied as first compressed fluid to the jet nozzle, the part of the compressed fluid being ejected from the jet nozzle, and a second fluid supply route along which another part of the compressed fluid supplied from the outside is discharged as second compressed fluid toward a downstream side in a discharge direction along which the dust and the first compressed fluid are discharged in the nozzle body.

Thus, the discharging of the second compressed fluid toward the downstream side in the discharge direction causes the dust and the first compressed fluid to be discharged to the outside via the suction nozzle and the nozzle body.

Moreover, the ejection volume adjustment part adjusts a flow channel area of the first fluid supply route to thereby adjust a flow rate of the first compressed fluid ejected from the jet nozzle. The suction volume adjustment part adjusts a flow channel area of the second fluid supply route to thereby adjust a flow rate of the second compressed fluid discharged on the downstream side in the discharge direction, whereby the amount of the dust and the amount of the compressed fluid suctioned by the suction nozzle are adjusted.

According to the structure, the dust removing device including the jet nozzle and the suction nozzle is equipped with the ejection volume adjustment part for adjusting the flow rate (ejection flow rate) of the first compressed fluid and the suction volume adjustment part for adjusting the flow rate (suction flow rate) of the second compressed fluid. Thus, the ejection flow rate of the first compressed fluid ejected from the jet nozzle toward the hole and the suction flow rate of the second compressed fluid for discharging dust and the first compressed fluid from the suction nozzle via the nozzle body by vacuum suction caused by discharging the second compressed fluid can be appropriately adjusted. As a result, the dust adhering to the hole can be efficiently removed.

Moreover, since the dust removing device includes the ejection volume adjustment part and the suction volume adjustment part, the first compressed fluid is ejected from the jet nozzle after the jet nozzle has been inserted into the hole and the suction nozzle has been brought into abutment against the object to thereby block up the hole in a state that vacuum suction is generated in advance by discharging the second compressed fluid, whereby dust is prevented from scattering to the outside during the dust removal.

On the other hand, in the dust removing system, the plurality of dust removing devices also include the ejection volume adjustment part and the suction volume adjustment part. Thus, the first compressed fluid can be ejected from the jet nozzles after the jet nozzles have been inserted into the respective holes and the suction nozzles have been brought into contact with the object to thereby block up the holes in a state that vacuum suction is caused in advance by sequentially supplying compressed fluid to each supply port in the corresponding dust removing device and discharging the second compressed fluid. Also in this case, the dust can be prevented from scattering to the outside during the dust removal.

In this manner, according to the present invention, the dust removing device includes the ejection volume adjustment part and the suction volume adjustment part. Thus, the first compressed fluid and the second compressed fluid can be supplied at different times, that is, vacuum suction is generated in advance, and thereafter the jet nozzle is inserted into the hole and then the first compressed fluid is ejected.

Furthermore, since the dust removing device includes the ejection volume adjustment part and the suction volume adjustment part, a desired removal task can be completed in a short time by performing vacuum suction and starting the ejection of the first compressed fluid after the suction nozzle has been brought into abutment against the object to thereby block up the hole with the ejection flow rate and the suction flow rate being appropriately adjusted. As a result, the amounts of the first compressed fluid and the second compressed fluid consumed can be reduced, thereby leading to a reduction in energy consumption of the external fluid supply source for supplying the compressed fluid.

Here, a base end portion of the jet nozzle is secured to the suction nozzle. The suction nozzle is attached to an inner circumferential surface of the nozzle body so as to be movable in an axial direction of the nozzle body. In this case, the second fluid supply route is a gap formed between a base end portion of the suction nozzle and the inner circumferential surface of the nozzle body. The suction volume adjustment part may adjust an opening degree of the gap by moving the suction nozzle in the axial direction relative to the inner circumferential surface of the nozzle body to thereby adjust the flow rate of the second compressed fluid.

In this manner, the suction flow rate can be easily adjusted since the suction flow rate is adjusted by a simple adjustment mechanism in which the suction nozzle is moved in the axial direction relative to the inner circumferential surface of the nozzle body to thereby adjust the opening degree of the gap.

In this case, the ejection volume adjustment part is a needle screw provided on the nozzle body to narrow down the first fluid supply route. Moreover, the suction volume adjustment part may include an adjustment thread formed in an outer circumferential surface of the suction nozzle and an adjustment thread formed in the inner circumferential surface of the nozzle body, the adjustment threads being configured to be screw-engaged with each other.

With the above configuration, it is possible to easily and efficiently adjust the ejection flow rate and the suction flow rate to appropriate flow rates. As a result, the dust adhering to the hole can be effectively removed.

Here, an ejection port through which the first compressed fluid is ejected may be formed in an outer circumferential surface and/or a distal end surface of a tip portion of the jet nozzle, and the tip portion of the jet nozzle may be replaceable.

The ejection port formed in the outer circumferential surface enables the first compressed fluid to be ejected toward the inner circumferential surface of the hole to thereby remove the dust adhering to the inner circumferential surface. On the other hand, the ejection port formed in the distal end surface enables the first compressed fluid to be ejected toward the bottom portion of the hole to thereby remove the dust adhering to the bottom portion. Furthermore, the replaceable tip portion having the ejection port enables easy maintenance of the jet nozzle and suitable replacement of the tip portion depending on the types of dust and the like.

Specifically, the ejection port may extend in an axial direction of the jet nozzle or in a radial direction of the jet nozzle, and/or may be inclined at a predetermined angle with respect to the radial direction.

In the case where the ejection port is inclined at a predetermined angle with respect to the radial direction, the first compressed fluid is ejected from the ejection port at an angle with respect to the radial direction. This forms swirling flow of the first compressed fluid inside the hole. Owing to the swirling flow, it is possible to efficiently remove the dust adhering to the hole. In particular, in a case where a screw thread is formed in the hole, when swirling flow is generated in a direction along which the thread is formed, effective removal of the dust can be achieved.

Moreover, the tip portion of the jet nozzle may include an inner cylindrical part connected to the jet nozzle and an outer cylindrical part attached onto the inner cylindrical part so as to be rotatable about a central axis of the jet nozzle. In this case, the inner cylindrical part may have an inner ejection port extending in the radial direction while the outer cylindrical part may have an outer ejection port inclined at a predetermined angle with respect to the radial direction.

In this manner, the tip portion is of a two-layer structure including the inner cylindrical part and the outer cylindrical part, and the inner cylindrical part located on the inner side is secured to the jet nozzle while the outer cylindrical part located on the outer side is rotatable about the inner cylindrical part as an axis. Thus, the first compressed fluid is ejected toward the hole when the positions of the inner ejection ports and the outer ejection ports coincide with each other. As a result, jets of the first compressed fluid are ejected in a pulsing manner from the jet nozzle toward the hole.

Moreover, the suction nozzle may include a tubular mounting portion attached to the nozzle body, and a tubular attachment portion detachable from the mounting portion and to which abase end portion of the jet nozzle is attached. In this case, a protrusion is formed on an outer circumferential surface of the attachment portion, and the mounting portion is provided with a locking part protruding inward of the mounting portion to lock the protrusion.

In this manner, the attachment portion and the jet nozzle are unitized so as to be detachable. Owing thereto, it is possible to suitably replace the unitized attachment portion and jet nozzle depending on the size (diameter) and depth of the hole, the types of dust, and the like. As a result, the user friendliness of the dust removing device and the maintainability of the jet nozzle as well are improved.

Moreover, the dust removing device further includes a first tubular body attached to a distal end portion of the suction nozzle so as to be movable along an outer circumferential surface of the suction nozzle, a first spring member interposed between the nozzle body and the first tubular body, and a first plunger provided on the nozzle body and extending in an axial direction of the nozzle body toward the first tubular body.

In this case, the nozzle body further includes an inlet channel through which the compressed fluid supplied from the outside is supplied to the first fluid supply route and the second fluid supply route. Moreover, a first seal body configured to open and close the inlet channel is attached to a base end portion of the first plunger.

When the first tubular body comes into contact with the object and the nozzle body moves toward the object against an elastic force of the first spring member to thereby bring the first plunger into abutment on the first tubular body, the first seal body opens the inlet channel due to displacement of the first plunger in the axial direction as the nozzle body moves toward the object.

When the first tubular body is separated from the object and the nozzle body is relatively separated from the first tubular body by the elastic force of the first spring member, the first seal body closes the inlet channel due to displacement of the first plunger in the axial direction.

In this manner, the first compressed fluid and the second compressed fluid can be supplied when the inlet channel is opened as the first seal body moves in accordance with the displacement of the first plunger that is in abutment against the first tubular body while the jet nozzle is inserted into the hole and the first tubular body is in contact with the object to thereby close the hole.

On the other hand, the supply of the first compressed fluid and the second compressed fluid is stopped when the first tubular body is separated from the object and the inlet channel is closed by the first seal body as the first plunger is displaced.

In this manner, the supply of the first compressed fluid and the second compressed fluid is automatically started and stopped due to the opening and closing of the inlet channel by the first seal body caused by abutment of the tubular body against the object. This prevents the first compressed fluid and the second compressed fluid from being unnecessarily supplied. As a result, energy consumption of the external fluid supply source for supplying the compressed fluid can be reduced.

Moreover, to avoid unnecessary supply of the compressed fluid, it is necessary that a solenoid valve for control should be provided at the supply port (the inlet channel) for the compressed fluid to supply or stop the compressed fluid. However, owing to a mechanism such as the above-described first seal body, the solenoid control valve can be omitted. In this manner, by eliminating the need for the solenoid valve for control, both hydraulic circuits and electric circuits can be cut down.

Moreover, a tip of the jet nozzle may be provided with a valve element configured to close an ejection port. In this case, the jet nozzle is inserted into the hole and the valve element comes into contact with a bottom portion of the hole to thereby displace the valve element in an axial direction of the jet nozzle, whereby the ejection port is opened, and the first compressed fluid is ejected from the ejection port.

In this manner, vacuum suction caused by discharging the second compressed fluid can be started before the ejection of the first compressed fluid from the ejection port is started. This prevents the dust adhering to the hole from scattering to the outside, thereby allowing the space for dust removal to be kept clean.

Moreover, the dust removing device may further include a second tubular body attached to a distal end portion of the suction nozzle so as to be movable along an outer circumferential surface of the suction nozzle, a second spring member interposed between the nozzle body and the second tubular body, and a second plunger provided on the nozzle body and extending in an axial direction of the nozzle body toward the second tubular body.

In this case, a second seal body configured to open and close the first fluid supply route is attached to a base end portion of the second plunger. When the second tubular body comes into contact with the object and the nozzle body moves toward the object against an elastic force of the second spring member to thereby bring the second plunger into abutment on the second tubular body, the second seal body opens the first fluid supply route due to displacement of the second plunger in the axial direction as the nozzle body moves toward the object. When the second tubular body is separated from the object and the nozzle body is relatively separated from the second tubular body by the elastic force of the second spring member, the second seal body closes the first fluid supply route due to displacement of the second plunger in the axial direction.

Also in this case, vacuum suction caused by discharging the second compressed fluid starts before the second seal body opens the first fluid supply route to thereby start the ejection of the first compressed fluid from the ejection port toward the hole. This prevents the dust adhering to the hole from scattering to the outside, and thus it is possible to keep the space for dust removal clean.

Moreover, the dust removing device may further include a tubular portion protruding from the nozzle body and/or the suction nozzle toward the object and configured to come into contact with a surface of the object before the jet nozzle comes into contact with a bottom portion of the hole when the jet nozzle is inserted into the hole.

Thus, it is possible to avoid a situation where the tip of the jet nozzle comes into contact with the bottom portion of the hole before the distal end of the suction nozzle comes into contact with the surface of the object due to the depth of the hole, to thereby fail to suction the dust. As a result, even when the depth of the hole varies, the distal end of the suction nozzle can be indirectly brought into abutment against the surface of the object via the tubular portion to thereby close the hole.

In this case, when the tubular portion is separated from the object, the tubular portion may return to a position prior to the contact with the object, by a spring-back function. Thus, regardless of the depth of the hole, the distal end of the suction nozzle can be indirectly brought into contact with the surface of the object via the tubular portion to thereby close the hole.

The dust removing device may further include a dust detecting unit configured to detect passage of the dust inside the nozzle body. Thus, it can be easily checked that the dust is not passing any longer and that the dust has been removed from the hole.

Moreover, when a notification signal indicating that the dust removal is completed is output from the dust detecting unit, the fluid supply source can immediately stop supplying the compressed fluid to the dust removing device based on the notification signal. In this manner, since the dust detecting unit quantitatively determines the completion of the dust removal, unnecessary consumption of the compressed fluid can be eliminated or reduced by using the determination result.

Moreover, the dust removing device may further include a blocking member replaceably attached to the suction nozzle and configured to block up an area around the hole in the surface of the object when the jet nozzle is inserted into the hole. Owing thereto, it is possible to remove dust without leaking the dust and the compressed fluid to the outside during the dust removal.

Moreover, a dust removing system according to the present invention includes the plurality of dust removing devices described above, and a compressed fluid supply block configured to connect and secure the dust removing devices and to supply the compressed fluid to the dust removing devices. Thus, in a case where the object has the plurality of holes, the dust can be simultaneously removed from the holes using the dust removing devices by inserting the jet nozzles into the respective holes. This leads to an efficient dust removal.

In this case, the dust removing devices may be secured at predetermined intervals in the longitudinal direction of the compressed fluid supply block such that the jet nozzles extend in the same direction as each other. Thus, in a case where the plurality of holes are formed in the surface of the object so as to be oriented in the same direction, the jet nozzles of the dust removing devices can be inserted into the respective holes to simultaneously remove the dust, thereby leading to a more efficient dust removal.

Furthermore, in the compressed fluid supply block, each of the dust removing devices may be provided with an attachment position adjustment mechanism configured to adjust an attachment position of the corresponding dust removing device. Thus, in the case where the object has the plurality of holes with different depths, by adjusting the attachment position of each of the dust removing devices, the tip portions of the jet nozzles can be inserted into the holes to appropriate depths to thereby remove the dust.

DESCRIPTION OF DRAWINGS

FIG. 1 is a cross-sectional view of a dust removing device according to an embodiment;

FIG. 2 is a cross-sectional view of the dust removing device in FIG. 1 illustrating a state where the suction flow rate is reduced;

DESCRIPTION OF EMBODIMENTS

Figure 3A:
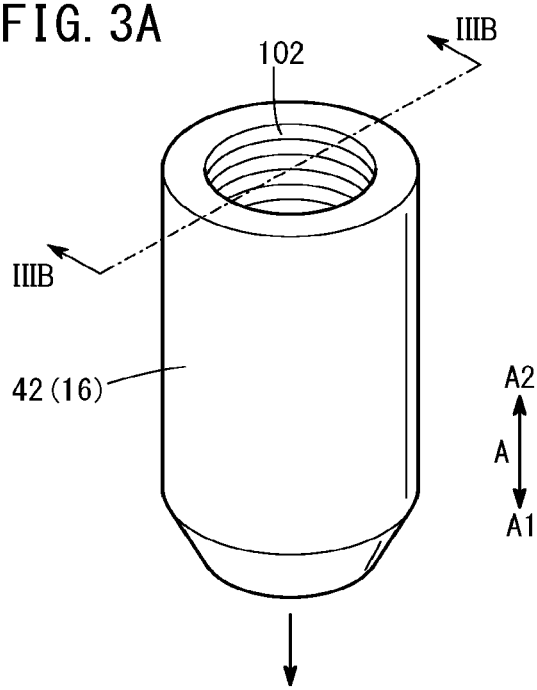
FIG. 3A is a perspective view of a tip portion of a jet nozzle of a first modification.

A preferred embodiment of a dust removing device and a dust removing system according to the present invention will be described in detail below with reference to the accompanying drawings.

1. Structure of Embodiment

FIGS. 1 and 2 are cross-sectional views of a dust removing device 10 according to an embodiment.

The dust removing device 10 is a nozzle device configured to eject compressed fluid (for example, pressurized air blown at a positive pressure) from a jet nozzle 16 into a hole 14 in a workpiece 12 serving as an object and, at the same time, to suction dust adhering to the hole 14 and the ejected compressed fluid by using a suction nozzle 18 enclosing the jet nozzle 16 in a state that the jet nozzle 16 is inserted into the hole 14 and the hole 14 is closed by the suction nozzle 18. The workpiece 12 is, for example, a work piece in which the hole 14 such a blind hole or a screw hole is formed by machining. The dust removing device 10 is applied for removal of dust such as chips or foreign substances remaining in the hole 14 after machining.

Specifically, the dust removing device 10 includes a hollow nozzle body 20. The nozzle body 20 is a stepped tubular member including a distal end portion 22 with a large diameter located in an A1 direction and a base end portion 24 with a small diameter located in an A2 direction (discharge direction). An adjustment thread 28 on the side of the nozzle body (suction volume adjustment part) is formed in a portion of the inner circumferential surface 26 of the nozzle body 20 that is adjacent to the distal end portion 22.

On the other hand, the suction nozzle 18 is a stepped tubular member extending along the central axis 30 of the nozzle body 20 and including a distal end portion 32 with a large diameter located in the A1 direction and a base end portion 34 with a small diameter located in the A2 direction. An adjustment thread 38 on the side of the suction nozzle (suction volume adjustment part) is formed in a portion of the outer circumferential surface 36 of the suction nozzle 18 that is adjacent to the distal end portion 32. The nozzle-body-side adjustment thread 28 and the suction-nozzle-side adjustment thread 38 are screw-engaged with each other to thereby screw the suction nozzle 18 into the nozzle body 20. The suction nozzle 18 is attached to the inner circumferential surface 26 of the nozzle body 20 to be substantially coaxial with the central axis 30.

The jet nozzle 16 is a tubular member including a base end portion 40 secured to a portion of the suction nozzle 18 that is adjacent to the base end portion 34 and a tip portion 42 protruding from the distal end portion 32 of the suction nozzle 18 in the A1 direction. In this case, the base end portion 40 of the jet nozzle 16 is secured to the suction nozzle 18 so as to communicate with a recess 44 formed between the distal end portion 32 and the base end portion 34 of the suction nozzle 18. The jet nozzle 16 has a substantially J shape extending radially inward from the base end portion 40 toward the central axis 30, bending in the A1 direction, and then extending along the central axis 30 in the A1 direction. Thus, the jet nozzle 16 includes a nozzle body portion 46 having a J-shaped cross-section and secured to the suction nozzle 18, and the tip portion 42 secured to the tip of the nozzle body portion 46. The tip portion 42 has ejection ports 48 formed in a direction along the central axis 30 (i.e., the axial direction indicated by A) and in radial directions orthogonal to the central axis 30.

The nozzle body 20 includes a compressed fluid supply part 54 at a middle portion 52 between the distal end portion 22 and the base end portion 24 on the outer circumferential surface 50. The compressed fluid supply part 54 is an annular or rectangular member disposed on the outer circumferential surface 50 of the nozzle body 20, and includes an inlet channel 56 to which compressed fluid is supplied from an external fluid supply source (not illustrated). An annular communicating hole 58 through which the inlet channel 56 and the nozzle body 20 communicate with each other is formed in the middle portion 52 of the nozzle body 20. Moreover, a communicating hole 60 communicating with the recess 44 is formed in the middle portion 52 at a position shifted away from the communicating hole 58 in the A1 direction.

A channel 62 having a substantially U-shaped cross-section through which the communicating hole 58 and the communicating hole 60 communicate with each other is formed in the compressed fluid supply part 54 at a position different from the inlet channel 56. A screw hole 64 communicating with the outside is formed in the channel 62 at a position located in the A2 direction. A needle screw 66 (ejection volume adjustment part) is screw-engaged in the screw hole 64.

The inner diameter of the inner circumferential surface 26 of the nozzle body 20 changes from the distal end portion 22 toward the base end portion 24, that is, the inner diameter at the nozzle-body-side adjustment thread 28 is the largest, the inner diameter at the middle portion 52 is the second largest, and the inner diameter at the base end portion 24 is the smallest. In this case, a step 68 is formed on the inner circumferential surface 26 at a portion of the base end portion 24 that is positioned adjacent to the communicating hole 58. In the inner circumferential surface 26, the base end portion 24 includes a diameter reducing part, a straight part extending along the central axis 30, and a diameter increasing part, which are arranged in this order from the step 68 in the A2 direction. The diameter reducing part and the straight part serve as a discharge surface 70 of the compressed fluid (second compressed fluid). Moreover, a portion inside the nozzle body 20 that extends from beyond the suction nozzle 18 in the A2 direction serves as a discharge channel 72 for discharging dust adhering to the hole 14 and the compressed fluid ejected from the ejection ports 48 to the outside.

The outer circumferential surface 36 of the suction nozzle 18 has a shape corresponding to the inner circumferential surface 26 of the nozzle body 20. More specifically, the suction-nozzle-side adjustment thread 38 is formed near the distal end portion 32. Moreover, a portion of the outer circumferential surface 36 between the suction-nozzle-side adjustment thread 38 and the base end portion 34 is straight so as to be brought into sliding contact with the inner circumferential surface 26 of the nozzle body 20 at the middle portion 52. The recess 44 is formed in the straight area. The base end portion 34 is inclined to be substantially parallel to the diameter reducing part of the discharge surface 70.

On the other hand, the inner circumferential surface 74 of the suction nozzle 18 has the largest inner diameter in an area corresponding to the distal end portion 32, narrows in the A2 direction in an area corresponding to the suction-nozzle-side adjustment thread 38, and has the smallest diameter in an area corresponding o the recess 44 and the base end portion 34. In this case, the area corresponding to the recess 44 and the base end portion 34 extending straight has an inner diameter substantially identical to the inner diameter of the straight part in the inner circumferential surface 26 of the nozzle body 20 corresponding to the base end portion 24. Moreover, the inner circumferential surface 74 of the suction nozzle 18 constitutes a discharge channel 76 for discharging, to the discharge channel 72, the dust adhering to the hole 14 and the compressed fluid ejected from the ejection ports 48.

The communicating hole 58 communicating with the inlet channel 56, the channel 62, the communicating hole 60, and the recess 44 constitute a first fluid supply route 80 for supplying, as first compressed fluid, part of the compressed fluid supplied from the external fluid supply source to the inlet channel 56, to a jet channel 78 inside the jet nozzle 16. On the other hand, the communicating hole 58 communicating with the inlet channel 56, a space between the base end portion 34 of the suction nozzle 18 and the inner circumferential surface 26 of the nozzle body 20, and a gap 82 between the base end portion 34 and the step 68 constitute a second fluid supply route 84 for discharging, as second compressed fluid, the other part of the compressed fluid supplied from the external fluid supply source to the inlet channel 56, to the discharge channel 72.

2. Operation of Embodiment

The operation of the dust removing device 10 according to the embodiment configured as above will now be described.

Here, an example of using the dust removing device 10 to remove dust such as chips or foreign substances remaining in the hole 14 formed in the workpiece 12 by machining will be described. In the explanation, the fluid supply source is an air supply source, and the compressed fluid, the first compressed fluid, and the second compressed fluid are respectively pressurized air, first pressurized air, and second pressurized air.

Prior to dust removal, the needle screw 66 is turned by a predetermined amount depending on the size (diameter) and depth of the hole 14, the types of dust, and the like to adjust the opening degree of a gap 86 between the tip of the needle screw 66 and the channel 62 in the first fluid supply route 80. This enables adjustment of the flow rate (ejection flow rate) of the first pressurized air supplied to the jet channel 78 of the jet nozzle 16 via the first fluid supply route 80.

Moreover, the nozzle-body-side adjustment thread 28 and the suction-nozzle-side adjustment thread 38 are turned relative to each other by a predetermined amount depending on the size (diameter) and depth of the hole 14, the types of dust, and the like to move the jet nozzle 16 and the suction nozzle 18 back and forth in the A direction with respect to the nozzle body 20, to thereby adjust the opening degree of the gap 82 between the step 68 and the base end portion 34. This enables adjustment of the flow rate (suction flow rate) of the second pressurized air discharged to the discharge channel 72 via the second fluid supply route 84.

While the ejection flow rate and the suction flow rate are adjusted in advance in this manner, the tip portion 42 of the jet nozzle 16 is inserted into the hole 14, and the distal end portion 32 of the suction nozzle 18 is brought into contact with an area around the hole 14 on the surface 88 of the workpiece 12. With this, the tip portion 42 of the jet nozzle 16 faces the bottom portion 90 and the inner circumferential surface 92 of the hole 14, and, at the same time, the hole 14 is covered and occluded with the suction nozzle 18.

Next, pressurized air is supplied from the external air supply source to the inlet channel 56. Part of the pressurized air supplied to the inlet channel 56 is distributed to the first fluid supply route 80 as the first pressurized air, and the other part is distributed to the second fluid supply route 84 as the second pressurized air.

The first pressurized air is supplied from the first fluid supply route 80 to the jet channel 78 of the jet nozzle 16 and ejected, as a positive-pressure air blow, from the plurality of ejection ports 48 of the tip portion 42 into the hole 14. In this case, the ejection port 48 substantially coaxial with respect to the central axis 30 ejects the first pressurized air toward the bottom portion 90 of the hole 14 to thereby cause the dust adhering to the bottom portion 90 to float. Moreover, the ejection ports 48 formed in the radial directions with the central axis 30 eject the first pressurized air toward the inner circumferential surface 92 of the hole 14 to thereby cause the dust adhering to the inner circumferential surface 92 to float.

On the other hand, the second pressurized air is discharged from the second fluid supply route 84 to the discharge channel 72 via the gap 82. In this case, the second pressurized air is discharged along the discharge surface 70 in the A2 direction. This causes jets of the second pressurized air to be ejected and the pressure in the space around the discharge surface 70 to be reduced, to thereby create a vacuum. A negative pressure due to the vacuum attracts the air (the second pressurized air serving as the jets and the like) toward the discharge surface 70. As a result, the jets of the second pressurized air flow along the discharge surface 70 in the A2 direction (discharge direction).

The flow of the second pressurized air causes the dust floated by the first pressurized air and the first pressurized air to be suctioned by vacuum from the hole 14 to the nozzle body 20 via the discharge channel 76 of the suction nozzle 18 and then discharged from the discharge channel 72 of the nozzle body 20 to the outside. The discharged dust is collected into a dust collection box or the like (not illustrated) via a hollow member through which the dust can pass, such as a dust collection hose connected to the discharge channel 72 of the nozzle body 20.

After all the dust inside the hole 14 has been suctioned and collected into the dust collection box, the supply of the pressurized air from the air supply source to the inlet channel 56 is stopped. This stops the ejection of the first pressurized air from the ejection ports 48 and the discharge of the second pressurized air to the discharge channel 72. Then, the dust removing device 10 is moved back in the A2 direction to separate the suction nozzle 18 from the workpiece 12 and to draw the jet nozzle 16 out of the hole 14. Then, the removal of dust from the hole 14 is completed.

FIG. 1 illustrates a case where the opening degree of the gap 82 is large and thus the flow rate (suction flow rate) of the second pressurized air discharged from the gap 82 is large. The suction volume of the first pressurized air and the dust is relatively large. On the other hand, FIG. 2 illustrates a case where the opening degree of the gap 82 is small and thus the flow rate of the second pressurized air discharged from the gap 82 is small. The suction volume of the first pressurized air and the dust is relatively small.

In the above-described explanation, the opening degree of the gap 86 is adjusted using the needle screw 66, and, at the same time, the opening degree of the gap 82 is adjusted using the nozzle-body-side adjustment thread 28 and the suction-nozzle-side adjustment thread 38 before the jet nozzle 16 is inserted into the hole 14. In the embodiment, the opening degrees of the gaps 82, 86 may be adjusted after the jet nozzle 16 is inserted into the hole 14 and before the pressurized air is supplied from the air supply source to the inlet channel 56.

3. Advantageous Effects of Embodiment

As described above, in accordance with the dust removing device 10 according to the embodiment, the dust removing device 10 including the jet nozzle 16 and the suction nozzle 18 is equipped with the needle screw 66 that adjusts the flow rate (ejection flow rate) of the first compressed fluid, and also equipped with the nozzle-body-side adjustment thread 28 and the suction-nozzle-side adjustment thread 38 that adjust the flow rate (suction flow rate) of the second compressed fluid. Thus, the ejection flow rate of the first compressed fluid ejected from the jet nozzle 16 toward the hole 14 and the suction flow rate of the second compressed fluid for discharging dust and the first compressed fluid from the suction nozzle 18 via the nozzle body 20 by a vacuum suction caused by discharging the second compressed fluid can be appropriately adjusted. As a result, the dust adhering to the hole 14 can be efficiently removed.

Moreover, the dust removing device 10 includes the nozzle-body-side adjustment thread 28, the suction-nozzle-side adjustment thread 38, and the needle screw 66. With this configuration, vacuum suction can be generated in advance by discharging the second compressed fluid, the tip portion 42 of the jet nozzle 16 can be inserted into the hole 14, the distal end portion 32 of the suction nozzle 18 can be brought into contact with the surface 88 of the workpiece 12 to thereby close the hole 14, and thereafter the first compressed fluid can be ejected from the ejection ports 48. This prevents dust from scattering toward the outside during the dust removal.

In this manner, since the dust removing device 10 includes the nozzle-body-side adjustment thread 28, the suction-nozzle-side adjustment thread 38, and the needle screw 66, the first compressed fluid and the second compressed fluid can be supplied at different times, that is, vacuum suction is generated in advance, and then the tip portion 42 of the jet nozzle 16 is inserted into the hole 14 to eject the first compressed fluid.

Furthermore, since the dust removing device 10 includes the nozzle-body-side adjustment thread 28, the suction-nozzle-side adjustment thread 38, and the needle screw 66, a desired removal task can be completed in a shorter time by generating vacuum suction and starting ejection of the first compressed fluid after the distal end portion 32 of the suction nozzle 18 has been brought into contact with the surface 88 of the workpiece 12 to thereby close the hole 14 with the ejection flow rate and the suction flow rate appropriately adjusted. As a result, the amounts of the first compressed fluid and the second compressed fluid consumed can be reduced, thereby leading to a reduction in energy consumption of the external fluid supply source supplying the compressed fluid.

Moreover, the suction flow rate of the second compressed fluid can be easily adjusted since the suction flow rate is adjusted by using a simple adjustment mechanism in which the base end portion 34 of the suction nozzle 18 is moved, in the A direction, relative to the step 68 in the inner circumferential surface 26 of the nozzle body 20 to thereby adjust the opening degree of the gap 82.

Moreover, the needle screw 66 is configured to narrow down the flow channel area of the first fluid supply route 80. On the other hand, the nozzle-body-side adjustment thread 28 and the suction-nozzle-side adjustment thread 38 are adjustment threads respectively formed in the inner circumferential surface 26 of the nozzle body 20 and the outer circumferential surface 36 of the suction nozzle 18, and which are screw-engaged with each other. With this configuration, it is possible to easily and efficiently adjust the ejection flow rate and the suction flow rate to appropriate flow rates. As a result, the dust adhering to the hole 14 can be effectively removed.

4. Modifications

Next, modifications (first to eleventh modifications) of the dust removing device 10 according to the embodiment will be described with reference to FIGS. 3A to 26. In the explanation of the first to eleventh modifications, the same reference numerals and symbols are used for components identical to those of the dust removing device 10 illustrated in FIGS. 1 and 2, and the detailed descriptions will be omitted.

4.1 First Modification

A dust removing device 10A of the first modification will now be described with reference to FIGS. 3A to 8C. The dust removing device 10A is different from the dust removing device 10 illustrated in FIGS. 1 and 2 in that the tip portion 42 of the jet nozzle 16 is replaceable.

Figure 3B:
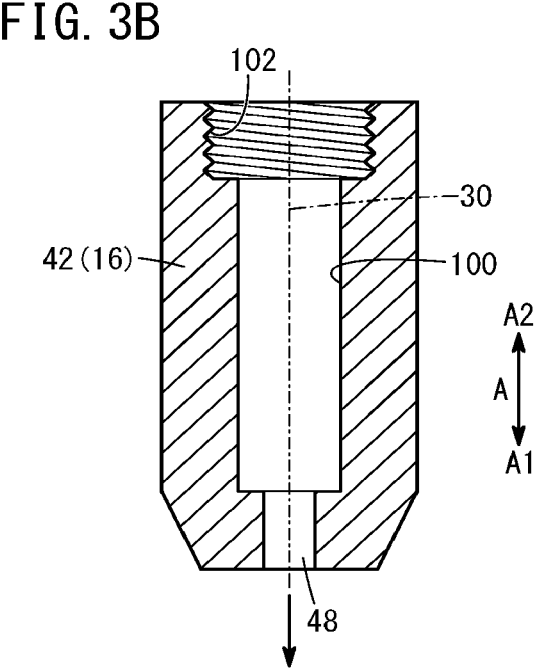
FIG. 3B is a cross-sectional view taken along line IIIB-IIIB in FIG. 3A.

FIGS. 3A and 3B illustrate a case where a channel 100 substantially coaxial with the central axis 30 is formed in the tip portion 42 and where the ejection port 48 substantially coaxial with the central axis 30 communicates with the channel 100. In this case, a part of the tip portion 42 located in the A1 direction (i.e., on a side of a distal end surface) where the ejection port 48 is formed is tapered in the A1 direction. Moreover, a screw thread 102 is formed in a part of the tip portion 42 that is located in the A2 direction. A thread (not illustrated) formed in a tip of the nozzle body portion 46 of the jet nozzle 16 and the thread 102 of the tip portion 42 are screw-engaged with each other. With this, the tip portion 42 is screwed onto the nozzle body portion 46, and the channel 100 and the jet channel 78 communicate with each other. Thus, in the first modification, the tip portion 42 of the jet nozzle 16 can be easily replaced. Note that arrows extending from the ejection port 48 in the A1 direction illustrated in FIGS. 3A and 3B indicate a direction along which the first compressed fluid is ejected.

Figure 4A:
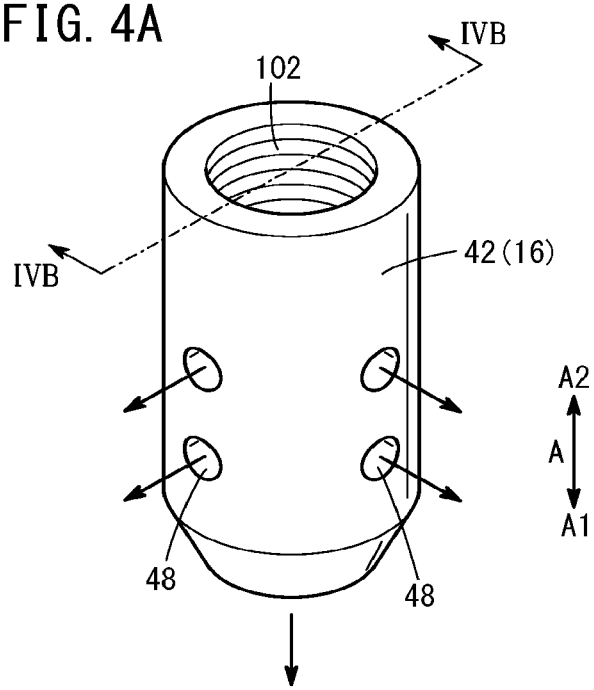
FIG. 4A is a perspective view of another structure of the first modification.
Figure 4B:
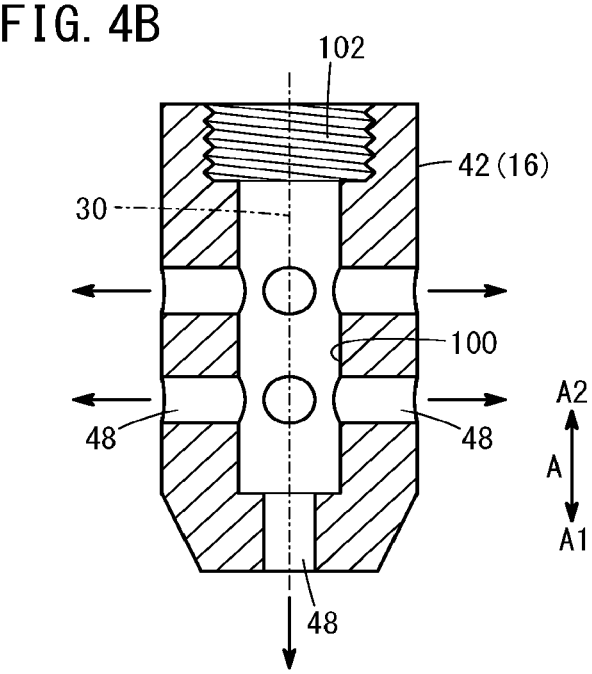
FIG. 4B is a cross-sectional view taken along line IVB-IVB in FIG. 4A.

An example illustrated in FIGS. 4A and 4B is different from the example illustrated in FIGS. 3A and 3B in that the plurality of ejection ports 48 are also formed in the outer circumferential surface in the radial directions in addition to the ejection port 48 in the part of the tip portion 42 located in the A1 direction. In this case, the plurality of ejection ports 48 formed in the radial directions are arranged at predetermined angular intervals in the circumferential direction of the tip portion 42 and at predetermined intervals in the longitudinal direction (A direction) of the tip portion 42, and the ejection ports 48 communicate with the channel 100.

Figure 5A:
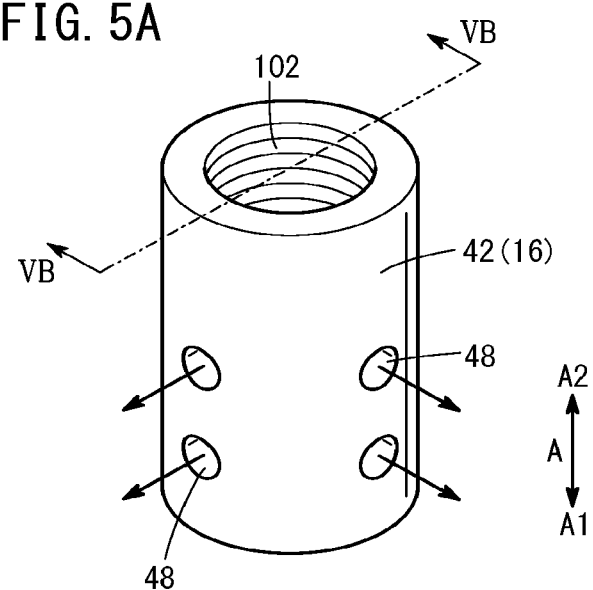
FIG. 5A is a perspective view of yet another structure of the first modification.
Figure 5B:
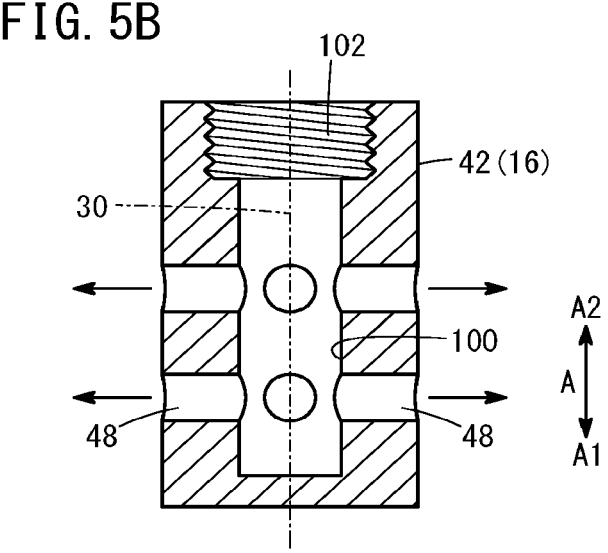
FIG. 5B is a cross-sectional view taken along line VB-VB in FIG. 5A.

An example illustrated in FIGS. 5A and 5B is different from the example illustrated in FIGS. 4A and 4B in that the part of the tip portion 42 located in the A1 direction (on the side of the distal end surface) is not provided with the ejection port 48 and is made flat.

As shown in FIGS. 3A to 5B, the replaceable tip portions 42 having the ejection ports 48 in the outer circumferential surface and/or the distal end surface of the tip portion 42 of the jet nozzle 16 enable easy maintenance of the jet nozzle 16 and appropriate replacement of the tip portion 42 depending on the type of dust and the like.

Moreover, the ejection ports 48 formed in the outer circumferential surface of the tip portion 42 enable the first compressed fluid to be ejected toward the inner circumferential surface 92 of the hole 14 in directions indicated by arrows to thereby remove the dust adhering to the inner circumferential surface 92. On the other hand, the ejection port 48 formed in the distal end surface of the tip portion 42 enable the first compressed fluid to be ejected toward the bottom portion 90 of the hole 14 in the direction indicated by the arrow to thereby remove the dust adhering to the bottom portion 90.

Figure 6A:
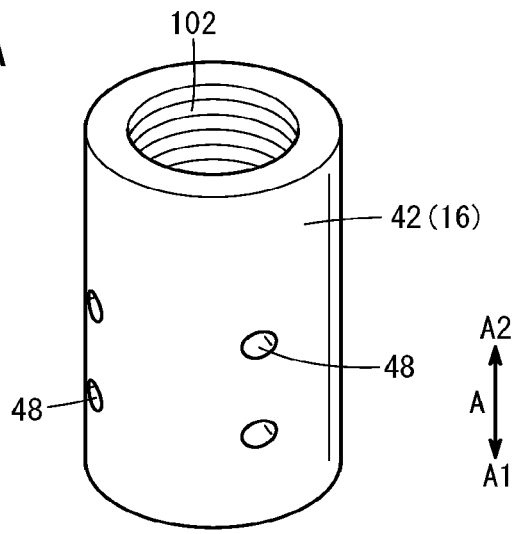
FIG. 6A is a perspective view of yet another structure of the first modification.
Figure 6B:
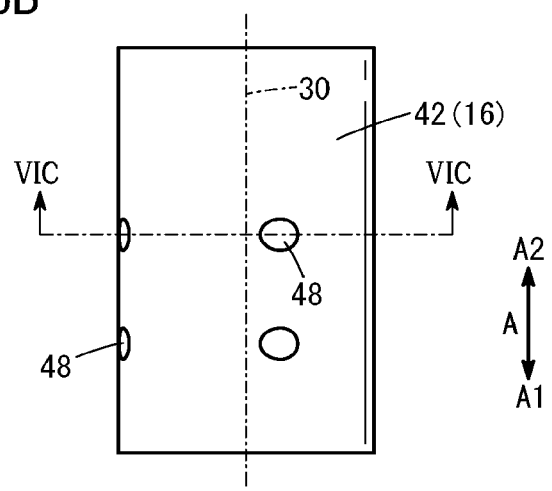
FIG. 6B is a side view of the tip portion in FIG. 6A.
Figure 6C:
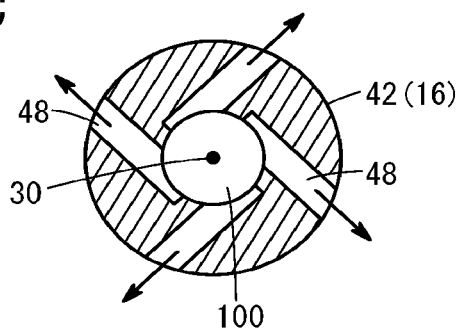
FIG. 6C is a cross-sectional view taken along line VIC-VIC in FIG. 6B.
Figure 7A:
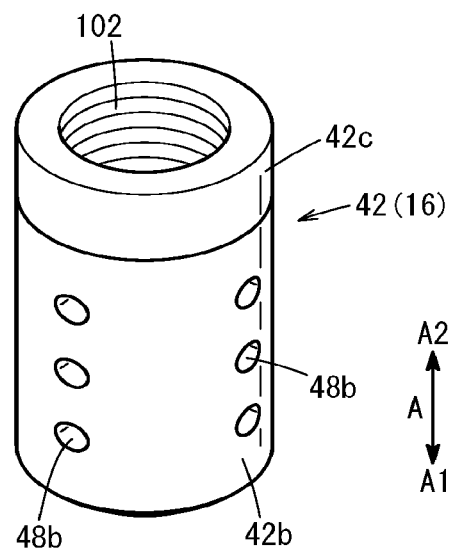
FIG. 7A is a perspective view of yet another structure of the first modification.
Figure 7B:
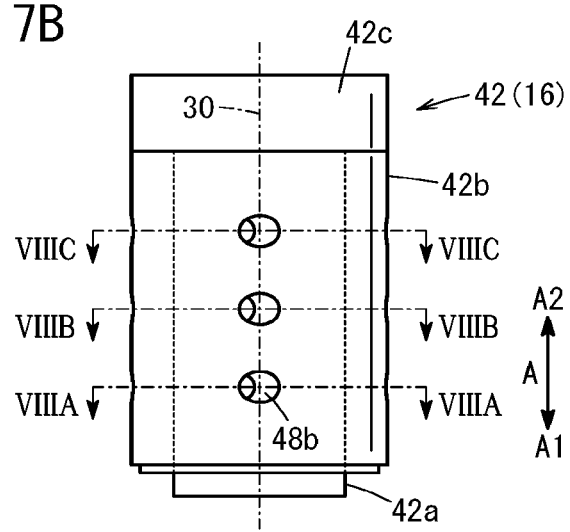
FIG. 7B is a side view of the tip portion in FIG. 7A.

An example illustrated in FIGS. 6A to 6C is different from the example illustrated in FIGS. 5A and 5B in that the ejection ports 48 formed in the outer circumferential surface of the tip portion 42 are inclined at a predetermined angle with respect to the radial directions. In this case, the first compressed fluid is ejected from the ejection ports 48 in directions indicated by arrows illustrated in FIG. 6C such that the ejection direction is inclined at an angle with respect to the radial directions. This forms swirling flow of the first compressed fluid around the tip portion 42 inside the hole 14. Owing to the swirling flow, it is possible to efficiently remove the dust adhering to the inner circumferential surface 92 of the hole 14. In particular, in a case where a screw thread is formed in the hole 14, when swirling flow is generated in a direction along which the thread is formed, it is possible to effectively remove the dust adhering to the roots of the thread.

An example illustrated in FIGS. 7A to 8C is different from the example illustrated in FIGS. 6A to 6C in that the tip portion 42 includes an inner cylindrical part 42a connected to the nozzle body portion 46 and an outer cylindrical part 42b attached onto the inner cylindrical part 42a so as to be rotatable about the central axis 30. The inner cylindrical part 42a is connected to a base end part 42c in which the screw thread 102 is formed. Moreover, the outer cylindrical part 42b is attached onto the inner cylindrical part 42a so as to be rotatable via, for example, a bearing (not illustrated).

Figure 8A:
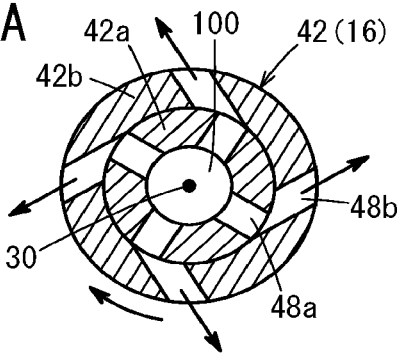
FIGS. 8A to 8C are cross-sectional views taken along lines VIIIA-VIIIA, VIIIB-VIIIB, and VIIIC-VIIIC, respectively, in FIG. 7B.
Figure 8B:
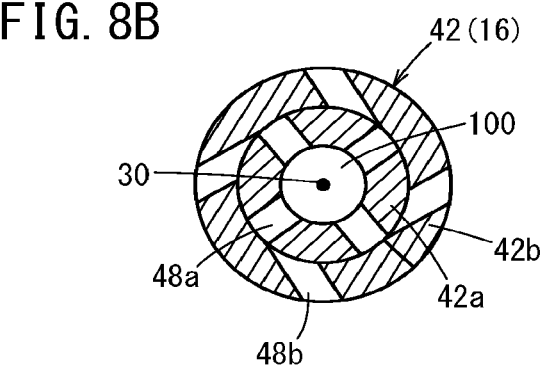
Figure 8C:
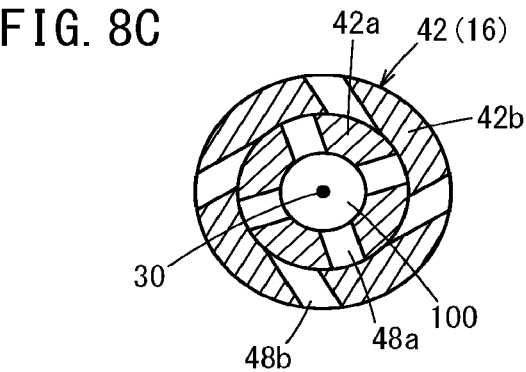

The inner cylindrical part 42a has a plurality of inner ejection ports 48a extending in the radial directions while the outer cylindrical part 42b has a plurality of outer ejection ports 48b inclined at a predetermined angle with respect to the radial directions. In this case, the plurality of inner ejection ports 48a formed in the radial directions are arranged at predetermined angular intervals in the circumferential direction of the inner cylindrical part 42a and at predetermined intervals in the A direction, and the ejection ports 48a communicate with the channel 100. Moreover, as illustrated in FIGS. 8A to 8C, the phases of the inner ejection ports 48a are shifted when viewed at different positions in the A direction. On the other hand, the plurality of outer ejection ports 48b are arranged at predetermined angular intervals in the circumferential direction of the outer cylindrical part 42b and at predetermined intervals in the A direction. In addition, the phases of the inner ejection ports 48a formed in the inner cylindrical part 42a and the phases of the outer ejection ports 48b formed in the outer cylindrical part 42b are shifted from each other.

In this manner, in the example illustrated in FIGS. 7A to 8C, the tip portion 42 has a two-layer structure including the inner cylindrical part 42a and the outer cylindrical part 42b. In this case, the inner cylindrical part 42a located inside is secured to the nozzle body portion 46 via the base end part 42c while the outer cylindrical part 42b is rotatable about the inner cylindrical part 42a as an axis. Thus, the first compressed fluid is ejected toward the inner circumferential surface 92 of the hole 14 when the positions (phases) of the inner ejection ports 48a and the outer ejection ports 48b coincide with each other. As a result, jets of the first compressed fluid are ejected in a pulsing manner from the jet nozzle 16 toward the inner circumferential surface 92 of the hole 14.

Moreover, as illustrated in FIG. 8A, in a case where the first compressed fluid is ejected from the outer ejection ports 48b in directions indicated by arrows, due to the jets of the first compressed fluid, the outer cylindrical part 42b rotates about the central axis 30 in a direction indicated by an arc-shaped arrow. This generates swirling flow of the first compressed fluid inside the hole 14 easily, and thus it is possible to efficiently remove the dust adhering to the hole 14.

As illustrated in FIGS. 8A to 8C, the inner ejection ports 48a are not aligned in the A direction and arranged at different angles in the circumferential direction. This enables jets of the first compressed fluid to be ejected in a pulsing manner sequentially in order from the outer ejection ports 48b at the back side i.e., adjacent to the bottom portion 90 of the hole 14, in the A2 direction, to thereby generate the swirling flow.

4.2 Second Modification

Figure 9:
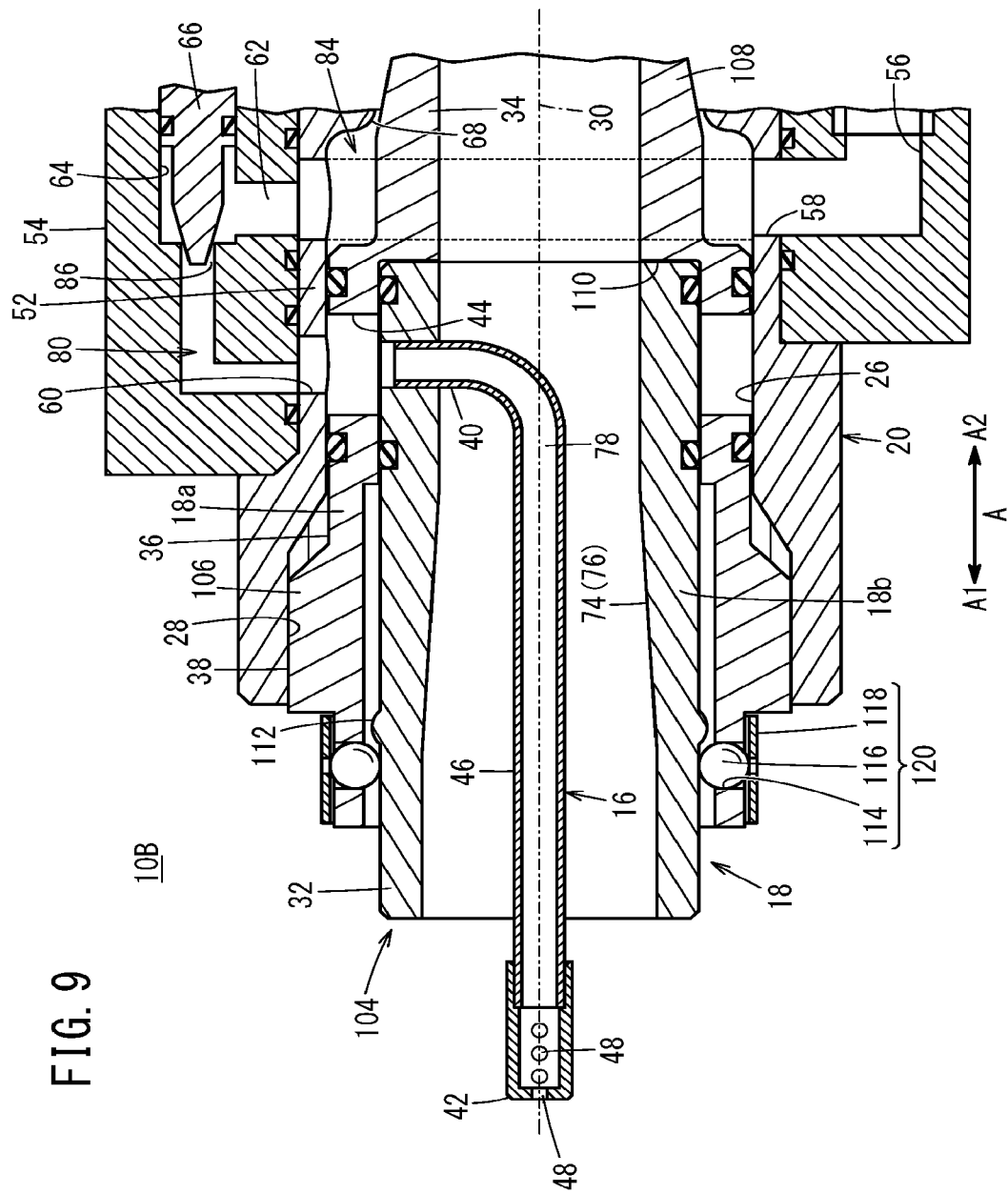
FIG. 9 is a partial sectional view of the distal end portion of a dust removing device of a second modification.

A dust removing device 10B of the second modification will now be described with reference to FIG. 9. The dust removing device 10B is different from the dust removing device 10 illustrated in FIGS. 1 and 2 in that the jet nozzle 16 and a part of the suction nozzle 18 are unitized into a nozzle unit 104 detachable from the dust removing device 10B.

The suction nozzle 18 includes a tubular mounting portion 18a and a tubular attachment portion 18b. The mounting portion 18a has the suction-nozzle-side adjustment thread 38 formed in the outer circumferential surface, and the suction-nozzle-side adjustment thread 38 and the nozzle-body-side adjustment thread 28 of the nozzle body 20 are screw-engaged with each other to thereby screw the mounting portion 18a into the nozzle body 20. The attachment portion 18b is detachable from the inner circumferential surface of the mounting portion 18a, and the base end portion 40 of the jet nozzle 16 is attached to the attachment portion 18b. Thus, the attachment portion 18b and the jet nozzle 16 jointly form the nozzle unit 104.

A part of the mounting portion 18a located in the A1 direction is defined as a large diameter part 106 in which the suction-nozzle-side adjustment thread 38 and the recess 44 are formed. Moreover, a part of the mounting portion 18a located in the A2 direction is defined as a small diameter part 108 connected to the large diameter part 106 and having the base end portion 34. The large diameter part 106 and the small diameter part 108 form a stepped part 110. Thus, the mounting portion 18a is a tubular member including the stepped part 110. The attachment portion 18b is fitted into the large diameter part 106 such that an end portion located in the A2 direction is brought into abutment against the stepped part 110.

That is, an annular protrusion 112 is formed on the outer circumferential surface of the attachment portion 18b. On the other hand, through-holes 114 are formed in the distal end portion of the mounting portion 18a in the radial directions, and steel balls 116 are disposed in the through-hole 114. Moreover, a steel ball retaining member 118 composed of a ring-shaped spring material for keeping the steel balls 116 inside the through-holes 114 is fitted on the outer circumferential surface of the distal end portion of the mounting portion 18a. The through-holes 114, the steel balls 116, and the steel ball retaining member 118 constitute a locking part 120 for locking the protrusion 112 when the attachment portion 18b is attached inside the large diameter part 106. More specifically, the steel ball retaining member 118 is a steel spring having a C shape formed by cutting off a portion from a ring and, when the protrusion 112 shifts in the A direction to climb over the steel balls 116, the steel ball retaining member operates to allow the steel balls 116 to move outward in response to radial movement of the steel balls 116 while holding the steel balls 116.

As in the suction nozzle 18 illustrated in FIGS. 1 and 2, in the inner circumferential surface (inner circumferential surface 74) of the attachment portion 18b, the inner diameter of a portion corresponding to the distal end portion 32 is the largest, the inner diameter of a portion corresponding to the suction-nozzle-side adjustment thread 38 slightly reduces in the A2 direction, and the inner diameter of a portion corresponding to the recess 44 is the smallest. In this case, the portion corresponding to the recess 44, which extends straight, has an inner diameter substantially identical to the inner diameter of the straight part of the base end portion 34 of the mounting portion 18a in the inner circumferential surface (inner circumferential surface 74).

To attach the nozzle unit 104 to the dust removing device 10B, the nozzle unit 104 is inserted into the large diameter part 106 while the base end portion 40 side of the jet nozzle 16 is oriented in the A2 direction. In this case, the protrusion 112 comes into abutment against the steel balls 116, so that the nozzle unit 104 is pushed in the A2 direction. The steel balls 116 incorporated into the large diameter part 106 move in the radial directions against the spring force of the steel ball retaining member 118 serving as a spring material, and thus the diameter of the large diameter part 106 increases. This allows the protrusion 112 to be shifted from the position of the steel balls 116 in the A2 direction, whereby the nozzle unit 104 is further pushed in. The steel balls 116 are then released from the pushing force of the protrusion 112 and return to the position shown in FIG. 9. When the nozzle unit 104 comes into contact with the stepped part 110, the locking part 120 locks the protrusion 112 to thereby fit the nozzle unit 104 into the dust removing device 10B.

On the other hand, to detach the nozzle unit 104 from the dust removing device 10B, the nozzle unit 104 is pulled in the A1 direction. In this case, although the protrusion 112 comes into abutment against the steel balls 116, further pulling of the nozzle unit 104 in the A1 direction causes the steel balls 116 to move in the radial directions against the spring force of the steel ball retaining member 118, so that the diameter of the large diameter part 106 increases. As a result, the protrusion 112 is displaced from the position of the steel balls 116 in the A1 direction, and the nozzle unit 104 can be detached. When the steel balls 116 are released from the pushing force of the protrusion 112, the locking part 120 returns to the position shown in FIG. 9.

In this manner, in the second modification, the attachment portion 18b and the jet nozzle 16 are unitized into the nozzle unit 104 which is detachable from the dust removing device 10B. Owing thereto, it is possible to suitably replace the nozzle unit 104 depending on the size (diameter) and depth of the hole 14, the type of dust, and the like. As a result, the user friendliness of the dust removing device 10B and the maintainability of the jet nozzle 16 as well are improved.

4.3 Third Modification

Figure 10:
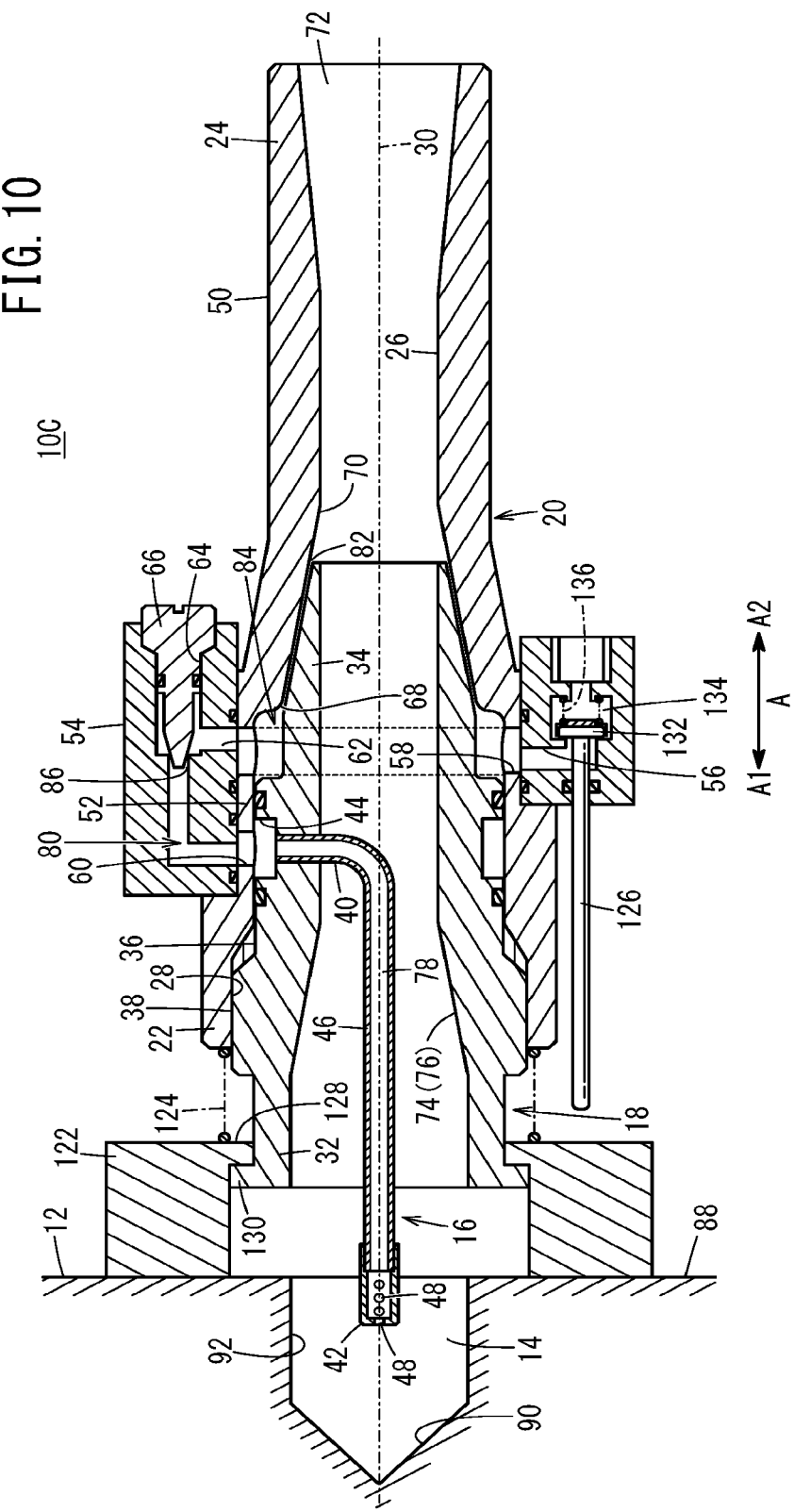
FIG. 10 is a cross-sectional view of a dust removing device of a third modification.

A dust removing device 10C of the third modification will now be described with reference to FIG. 10. The dust removing device 10C is different from the dust removing device 10 illustrated in FIGS. 1 and 2 in that the dust removing device 10C further includes a tubular body 122 (first tubular body) attached to the distal end portion 32 of the suction nozzle 18 so as to be movable along the outer circumferential surface 36 of the suction nozzle 18, a spring member 124 (first spring member) interposed between the nozzle body 20 and the tubular body 122, and a plunger 126 (first plunger) provided to the compressed fluid supply part 54 of the nozzle body 20 and extending along the central axis 30 (A direction) toward the tubular body 122.

In this case, the tip portion 42 of the jet nozzle 16 protrudes from the tubular body 122 in the A1 direction. Moreover, the tubular body 122 can be brought into contact with the surface 88 of the workpiece 12 so as to enclose the hole 14. Furthermore, an annular protruding portion 128 extends radially inward from a part of the tubular body 122 located in the A2 direction toward the central axis 30 and is in contact with a distal end portion 32 side of the outer circumferential surface 36 of the suction nozzle 18. The spring member 124 is interposed between the protruding portion 128 and the distal end portion 22 of the nozzle body 20. On the other hand, an annular protruding portion 130 extends radially outward from the distal end portion 32 of the suction nozzle 18 and is in contact with the inner circumferential surface of the tubular body 122. Thus, the protruding portion 128 is slidable within a range between the protruding portion 130 and the suction-nozzle-side adjustment thread 38 in the A direction.

On the other hand, the plunger 126 is disposed in the inlet channel 56 of the compressed fluid supply part 54, and a seal body 132 (first seal body) capable of opening and closing the inlet channel 56 is attached to the base end portion of the plunger. The seal body 132 is disposed inside a chamber 134 provided at an intermediate position of the inlet channel 56, and a spring member 136 is interposed between a point inside the chamber 134 located in the A2 direction and the seal body 132. Thus, the seal body 132 is pushed toward a point (seating position) located in the A1 direction inside the chamber 134 by the elastic force of the spring member 136, the pushing force acting due to the pressure of the compressed fluid, or both the elastic force and the pushing force. FIG. 10 illustrates a state where the inlet channel 56 is closed by the seal body 132 being pushed against the seating position inside the chamber 134 when viewed from the external fluid supply source.

Here, even when supply of the compressed fluid from the fluid supply source to the inlet channel 56 is started, the compressed fluid is not supplied downstream of the inlet channel 56 since the inlet channel 56 is closed by the seal body 132. In this state, the tip portion 42 of the jet nozzle 16 is inserted into the hole 14, the tubular body 122 is placed in contact with the surface 88 of the workpiece 12 to thereby close the hole 14, and the nozzle body 20 is pushed in the A1 direction. Then, the jet nozzle 16, the suction nozzle 18, and the nozzle body 20 are displaced altogether in the A1 direction against the elastic force of the spring member 124 (by compressing the spring member 124). When the jet nozzle 16, the suction nozzle 18, and the nozzle body 20 are further displaced in the A1 direction, the tip of the plunger 126 comes into abutment on the tubular body 122.

Subsequently, when the nozzle body 20 is further shifted in the A1 direction, the plunger 126 receives a force in the A2 direction from the tubular body 122 and moves in the A2 direction against the elastic force of the spring member 136, the pushing force due to the pressure of the compressed fluid, or both the elastic force and the pushing force. As a result, the seal body 132 is separated from the seating position in the A2 direction inside the chamber 134 to thereby change the state of the inlet channel 56 from closed to open.

With this, supply of the first compressed fluid from the opened inlet channel 56 to the first fluid supply route 80 is started, and supply of the second compressed fluid to the second fluid supply route 84 is started. As a result, while the first compressed fluid is ejected from the ejection ports 48 to thereby make the dust adhering to the hole 14 float, the first compressed fluid and the dust can be suctioned via the suction nozzle 18 and discharged from the discharge channel 72 to the outside using the second compressed fluid discharged from the second fluid supply route 84 to the discharge channel 72.

On the other hand, when the dust adhering to the hole 14 is removed, the tubular body 122 is separated from the surface 88 of the workpiece 12. With this, the nozzle body 20 is relatively separated from the tubular body 122 by the elastic force of the spring member 124. As a result, the plunger 126 is released from a state of being pushed by the tubular body 122 and moves in the A1 direction. With this, the seal body 132 returns to the seating position by the elastic force of the spring member 136, the pushing force due to the pressure of the compressed fluid, or both the elastic force and the pushing force to thereby close the inlet channel 56. As a result, the supply of the compressed fluid downstream of the inlet channel 56 is stopped.

In this manner, in the third modification, the jet nozzle 16 is inserted into the hole 14, the tubular body 122 is in contact with the surface 88 of the workpiece 12 to thereby close the hole 14, and the inlet channel 56 is opened by the seal body 132 moving in accordance with the displacement of the plunger 126 that is in abutment against the tubular body 122, whereby the first compressed fluid and the second compressed fluid can be supplied.

On the other hand, the supply of the first compressed fluid and the second compressed fluid is stopped when the tubular body 122 is separated from the surface 88 of the workpiece 12 to thereby move the plunger 126 and then close the inlet channel 56 with the seal body 132.

In this manner, the supply of the first compressed fluid and the second compressed fluid is automatically started and stopped due to the opening and closing of the inlet channel 56 by the seal body 132 caused by abutment of the tubular body 122 against the workpiece 12. This prevents the first compressed fluid and the second compressed fluid from being unnecessarily supplied. As a result, energy consumption of the external fluid supply source for supplying the compressed fluid can be reduced.

Moreover, to avoid unnecessary supply of compressed fluid, it is necessary that a solenoid valve for control should be provided at the supply port (inlet channel 56) of the compressed fluid to supply or stop the compressed fluid. In contrast, since the dust removing device 10C of the third modification includes a mechanism including the above-described seal body 132, the solenoid valve for control can be omitted. In this manner, by eliminating the need for the solenoid valve for control, both hydraulic circuits and electric circuits can be cut down.

4.4 Fourth Modification

A dust removing device 10D of the fourth modification will now be described with reference to FIGS. 11 to 12B. The dust removing device 10D is different from the dust removing device 10 illustrated in FIGS. 1 and 2 in that the tip portion 42 of the jet nozzle 16 is provided with a valve element 138 capable of opening and closing the ejection port 48 for ejecting the first compressed fluid.

A disk member 142 having a plurality of holes 140 formed in the A direction is attached to the inner circumferential surface of the jet nozzle 16 in the jet channel 78 of the jet nozzle 16. A spring member 144 is interposed between the disk member 142 and the base end portion of the valve element 138. Under normal conditions illustrated in FIG. 12A, the valve element 138 closes the ejection port 48 by the elastic force of the spring member 144, the pushing force due to the pressure of the first compressed fluid, or both the elastic force and the pushing force. Thus, even when the first compressed fluid is supplied to the jet channel 78 of the jet nozzle 16, the first compressed fluid cannot be ejected from the ejection port 48.

Figure 11:
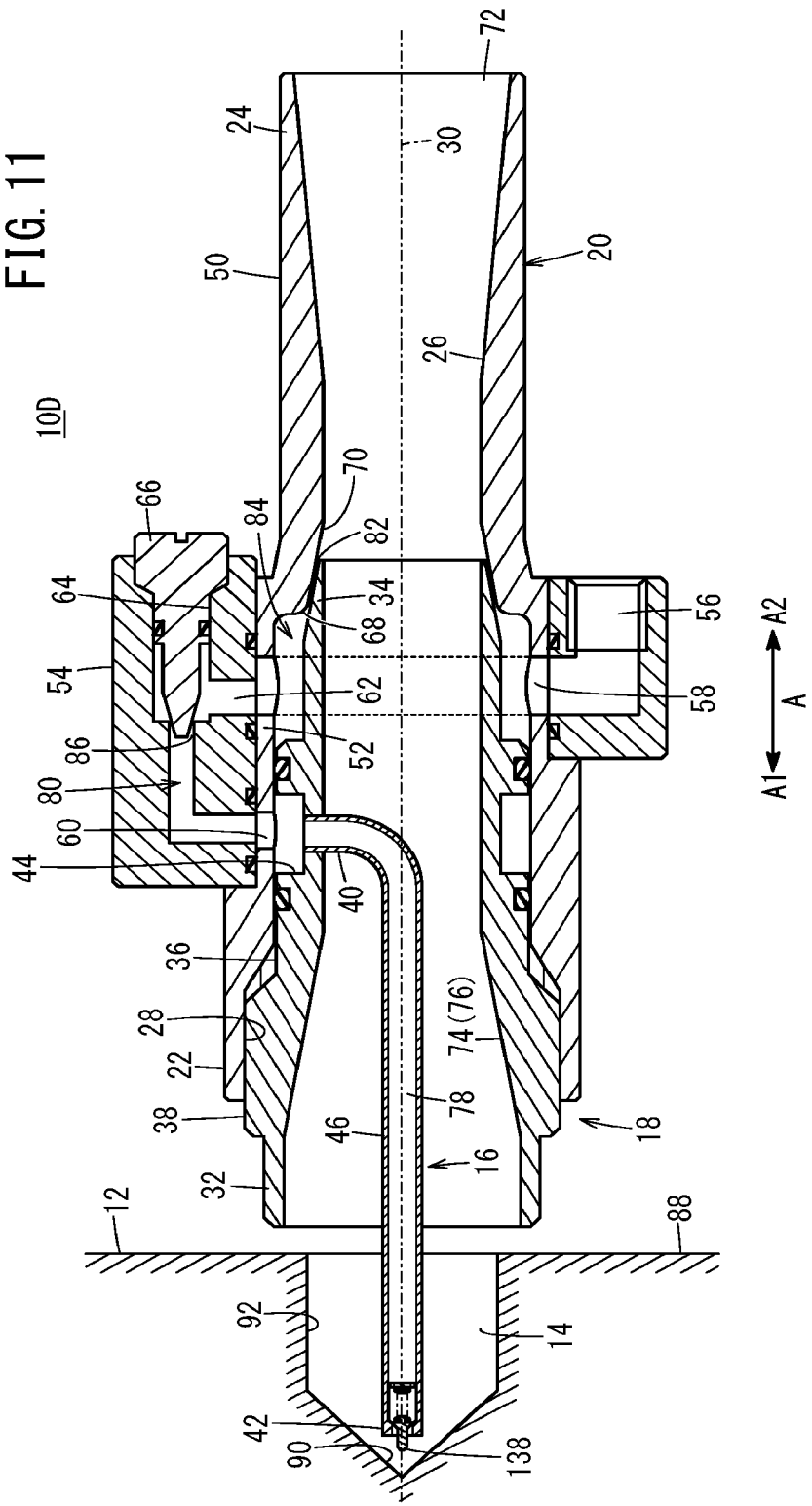
FIG. 11 is a cross-sectional view of a dust removing device of a fourth modification.
Figure 12A:
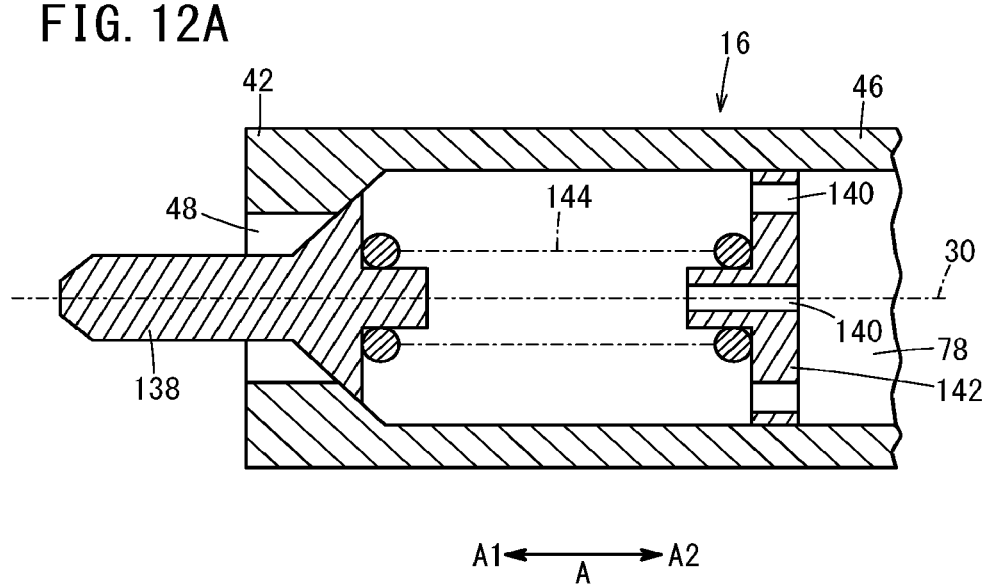
FIGS. 12A and 12B are enlarged partial sectional views illustrating the tip portion of the jet nozzle in FIG. 11.
Figure 12B:
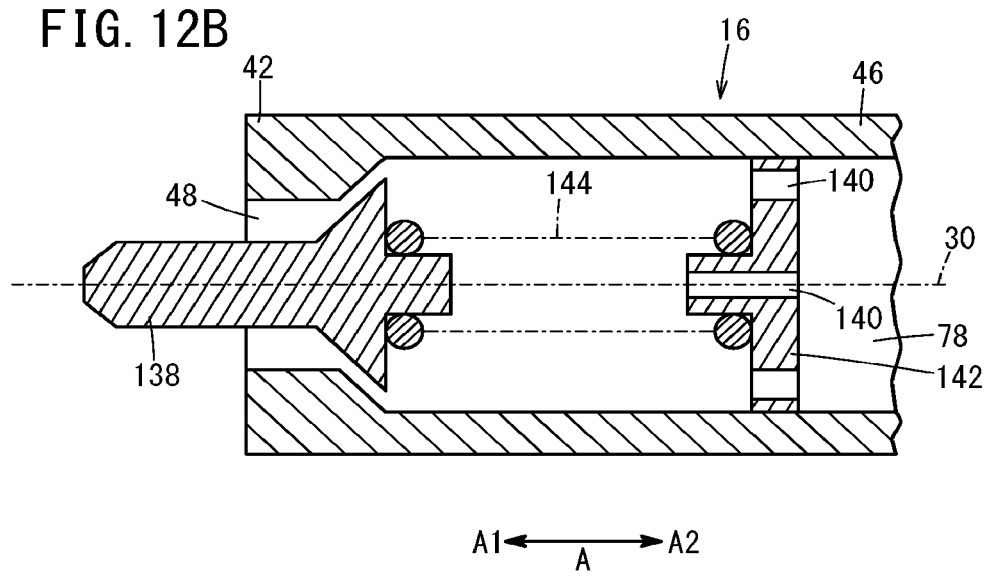

In this case, as illustrated in FIG. 11, the second compressed fluid can be discharged to the discharge channel 72 via the second fluid supply route 84. Therefore, in the dust removing device 10D, vacuum suction can be performed by discharging the second compressed fluid even in a state where the first compressed fluid is not ejected from the ejection port 48.

Here, when the jet nozzle 16 is inserted into the hole 14 to bring the tip of the valve element 138 into contact with the bottom portion 90 (see FIG. 11) of the hole 14, the valve element 138 moves in the A2 direction against the elastic force of the spring member 144, the pushing force due to the pressure of the first compressed fluid, or both the elastic force and the pushing force. This causes the ejection port 48 to be opened, and thus makes it possible to eject the first compressed fluid from the ejection port 48, as illustrated in FIG. 12B.

On the other hand, when the tip of the valve element 138 is separated from the bottom portion 90 of the hole 14, the valve element 138 moves in the A1 direction by the elastic force of the spring member 144, the pushing force due to the pressure of the first compressed fluid, or both the elastic force and the pushing force. With this, the state illustrated in FIG. 12B changes to the state illustrated in FIG. 12A, and the ejection port 48 is blocked. As a result, the ejection of the first compressed fluid from the ejection port 48 is stopped.

In this manner, in the dust removing device 10D, vacuum suction caused by discharging the second compressed fluid can be started before ejection of the first compressed fluid from the ejection port 48 is started. This prevents the dust adhering to the hole 14 from scattering to the outside before start of vacuum suction, and thus the space for dust removal can be kept clean.

4.5 Fifth Modification

Figure 13:
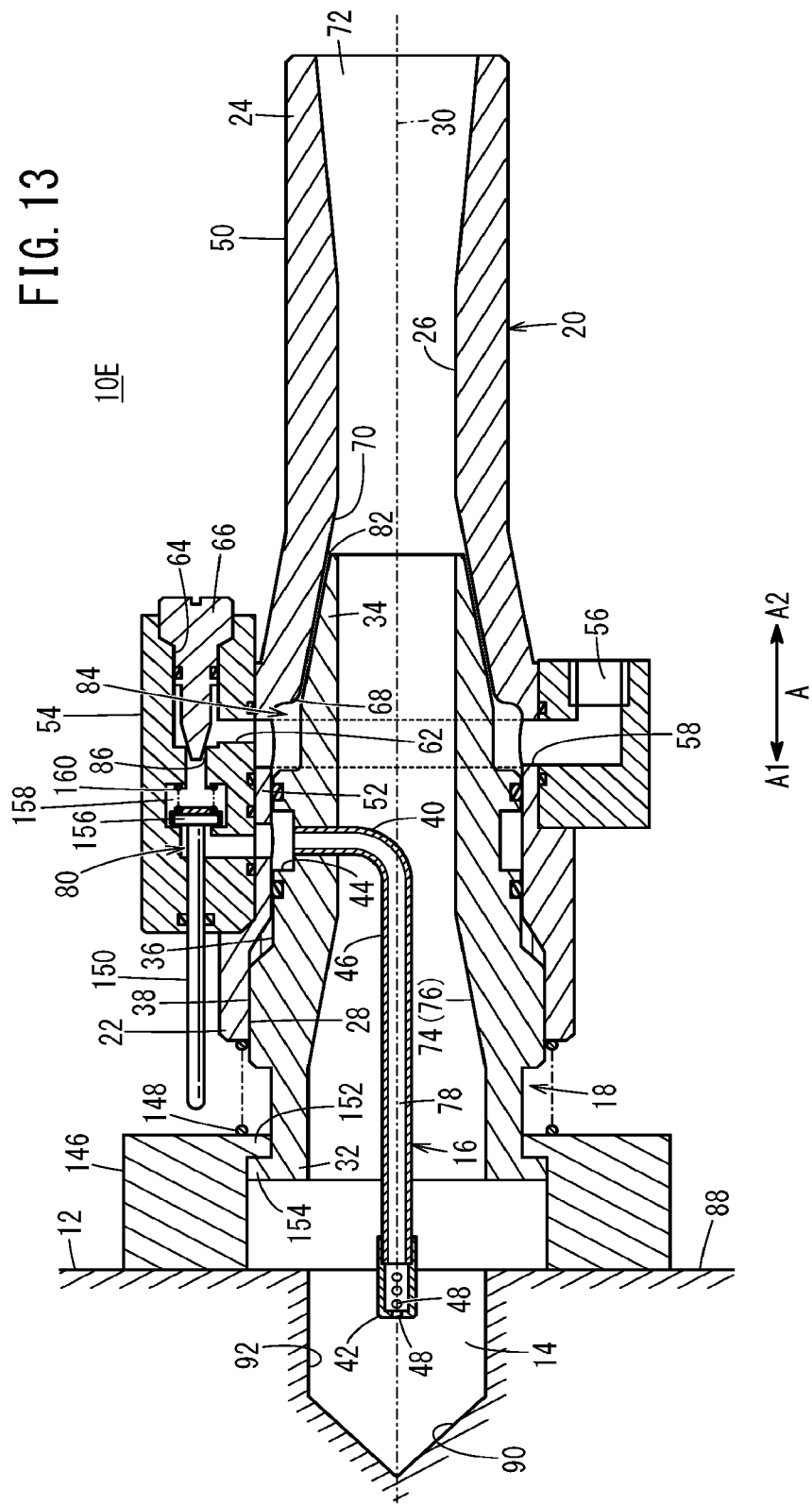
FIG. 13 is a cross-sectional view of a dust removing device of a fifth modification.

A dust removing device 10E of the fifth modification will now be described with reference to FIG. 13. The dust removing device 10E is different from the dust removing device 10 illustrated in FIGS. 1 and 2 in that the dust removing device 10E further includes a tubular body 146 (second tubular body) attached to the distal end portion 32 of the suction nozzle 18 so as to be movable along the outer circumferential surface 36 of the suction nozzle 18, a spring member 148 (second spring member) interposed between the nozzle body 20 and the tubular body 146, and a plunger 150 (second plunger) provided to the compressed fluid supply part 54 of the nozzle body 20 and extending along the central axis 30 (A direction) toward the tubular body 146.

In this case, the configuration about the tubular body 146 and the spring member 148 is similar to the configuration of the tubular body 122 and the spring member 124 (see FIG. 10) of the dust removing device 10C according to the third modification. That is, the tip portion 42 of the jet nozzle 16 protrudes from the tubular body 146 in the A1 direction, and the tubular body 146 can be brought into contact with the surface 88 of the workpiece 12 so as to enclose the hole 14. Moreover, an annular protruding portion 152 is formed on a part of the tubular body 146 located in the A2 direction, and the spring member 148 is interposed between the protruding portion 152 and the distal end portion 22 of the nozzle body 20. Furthermore, an annular protruding portion 154 is formed on a part of the distal end portion 32 of the suction nozzle 18, and the protruding portion 152 is slidable within a range between the protruding portion 154 and the suction-nozzle-side adjustment thread 38 in the A direction.

In the fifth modification, the plunger 150 is disposed on a downstream side of the needle screw 66 in the channel 62 of the compressed fluid supply part 54, and a seal body 156 (second seal body) capable of opening and closing the channel 62 is attached to the base end portion of the plunger. In this case, the seal body 156 is disposed inside a chamber 158 provided at an intermediate position in the channel 62, and a spring member 160 is interposed between a point inside the chamber 158 located in the A2 direction and the seal body 156. Thus, the seal body 156 is pushed toward a point (seating position) located in the A1 direction inside the chamber 158 by the elastic force of the spring member 160, the pushing force acting due to the pressure of the first compressed fluid, or both the elastic force and the pushing force. FIG. 13 illustrates a state where the channel 62 is closed by the seal body 156 being pushed against the seating position inside the chamber 158.

Here, even when supply of the first compressed fluid to the channel 62 is started, the first compressed fluid is not supplied from the channel 62 to the jet nozzle 16 since the channel 62 is closed by the seal body 156. On the other hand, the second compressed fluid can be discharged to the discharge channel 72 via the second fluid supply route 84. Therefore, in the dust removing device 10E, vacuum suction can be performed by discharging the second compressed fluid even in a state where the first compressed fluid is not supplied to the jet nozzle 16.

When the nozzle body 20 is pushed in the A1 direction while the tip portion 42 of the jet nozzle 16 is inserted into the hole 14 and the tubular body 146 is in contact with the surface 88 of the workpiece 12 to thereby close the hole 14 in the above-described state, the jet nozzle 16, the suction nozzle 18, and the nozzle body 20 are displaced altogether in the A1 direction against the elastic force of the spring member 148 (by compressing the spring member 148). When the jet nozzle 16, the suction nozzle 18, and the nozzle body 20 are further displaced in the A1 direction, the tip of the plunger 150 comes into abutment against the tubular body 146.

Subsequently, when the nozzle body 20 is further displaced in the A1 direction, the plunger 150 receives a force in the A2 direction from the tubular body 146 and moves in the A2 direction against the elastic force of the spring member 160, the pushing force acting due to the pressure of the first compressed fluid, or both the elastic force and the pushing force. As a result, the seal body 156 is separated from the seating position in the A2 direction inside the chamber 158 to thereby change the state of the channel 62 from closed to open.

Thus, supply of the first compressed fluid from the opened channel 62 to the jet nozzle 16 is started. As a result, while the first compressed fluid is ejected from the ejection ports 48 to thereby make the dust adhering to the hole 14 float, the first compressed fluid and the dust can be suctioned and discharged from the discharge channel 72 to the outside by the second compressed fluid being discharged from the second fluid supply route 84 to the discharge channel 72.

On the other hand, after the dust adhering to the hole 14 has been removed, the tubular body 146 is separated from the surface 88 of the workpiece 12. With this, the nozzle body 20 is relatively separated from the tubular body 146 by the elastic force of the spring member 148. As a result, the plunger 150 is released from a state of being pushed by the tubular body 146 and then displaced in the A1 direction. With this, the seal body 156 returns to the seating position by the elastic force of the spring member 160, the pushing force acting due to the pressure of the first compressed fluid, or both the elastic force and the pushing force, to thereby close the channel 62. As a result, the supply of the first compressed fluid from the channel 62 to the jet nozzle 16 is stopped.

In this manner, also in the fifth modification, vacuum suction caused by discharging the second compressed fluid is started before the seal body 156 opens the channel 62 of the first fluid supply route 80 to thereby start ejection of the first compressed fluid from the ejection ports 48 to the hole 14. This prevents the dust adhering to the hole 14 from scattering to the outside before start of vacuum suction, and thus the space for dust removal can be kept clean.

4.6 Sixth Modification

A dust removing device 10F of the sixth modification will now be described with reference to FIGS. 14 to 16. The dust removing device 10F is different from the dust removing device 10 illustrated in FIGS. 1 and 2 in that the dust removing device 10F further includes a tubular portion 161 protruding from the nozzle body 20 and/or the suction nozzle 18 toward the workpiece 12 and coming into contact with the surface 88 of the workpiece 12 before the jet nozzle 16 comes into contact with the bottom portion 90 of the hole 14 when the jet nozzle 16 is inserted into the hole 14.

Figure 14:
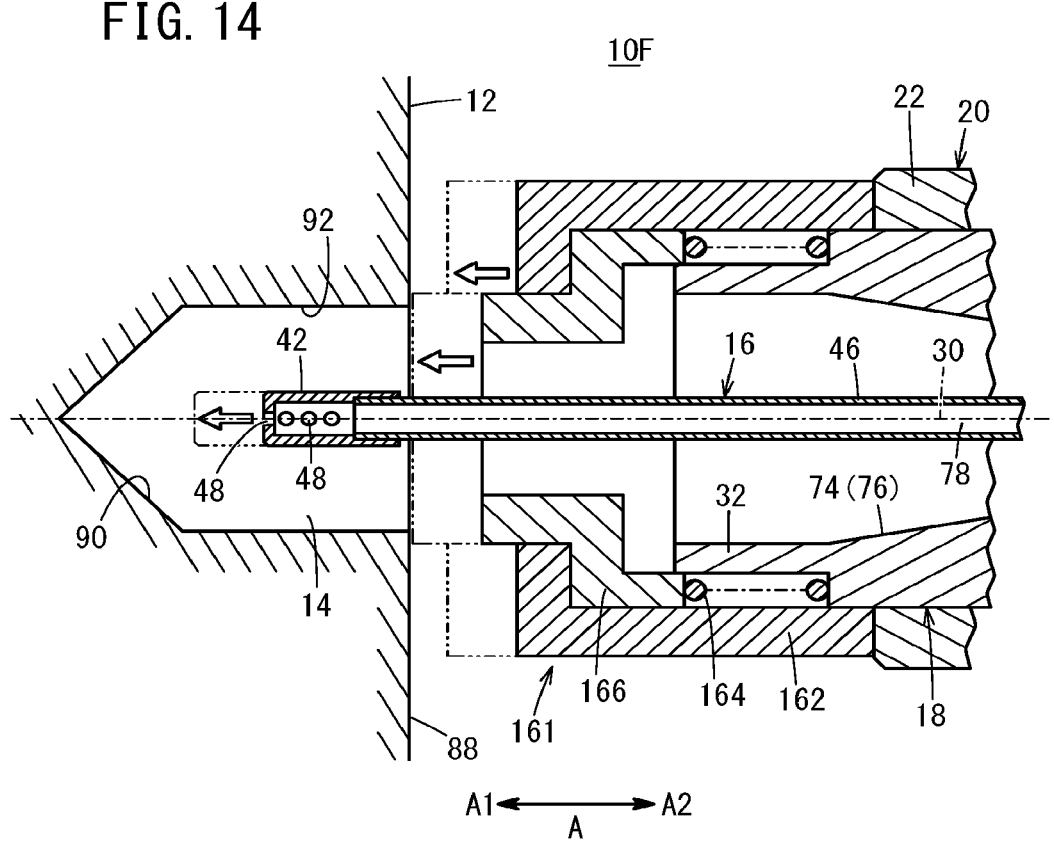
FIG. 14 is a partial sectional view of the distal end portion of a dust removing device of a sixth modification.

In the example illustrated in FIG. 14, the tubular portion 161 includes a first cylindrical member 162 attached to the distal end portion 22 of the nozzle body 20 and a second cylindrical member 166 disposed inside the first cylindrical member 162 and attached to the distal end portion 32 of the suction nozzle 18 via a spring member 164. The distal end portion of the first cylindrical member 162 located in the A1 direction extends radially inward toward the central axis 30 and is in abutment on a stepped portion of the second cylindrical member 166 located in the A1 direction. In this case, the second cylindrical member 166 is pushed toward the distal end portion of the first cylindrical member 162 by the elastic force of the spring member 164. Moreover, the leading end of the second cylindrical member 166 protrudes in the A1 direction beyond the leading end of the first cylindrical member 162.

Here, when the dust removing device 10F is moved in the A1 direction while the tip portion 42 of the jet nozzle 16 is inserted into the hole 14, the leading end of the second cylindrical member 166 comes into abutment on an area around the hole 14 on the surface 88 of the workpiece 12 before the tip portion 42 comes into contact with the bottom portion 90 of the hole 14. When the dust removing device 10F is further moved in the A1 direction, the second cylindrical member 166 receives a force in the A2 direction from the workpiece 12 and is then displaced in the A2 direction against the elastic force of the spring member 164. As a result, the tubular portion 161 can be brought into contact with the surface 88 of the workpiece 12 with the leading ends of the first cylindrical member 162 and the second cylindrical member 166 being substantially flush with each other and without the tip portion 42 being brought into contact with the bottom portion 90 of the hole 14.

On the other hand, when the dust removing device 10F is moved backward and away from the surface 88 of the workpiece 12 in the A2 direction, the second cylindrical member 166 returns to the position prior to the contact with the workpiece 12 (i.e., a position illustrated in FIG. 14), by the elastic force of the spring member 164 (spring-back function).

In this manner, in the sixth modification, it is possible to avoid a situation where the tip portion 42 of the jet nozzle 16 comes into contact with the bottom portion 90 of the hole 14 before the distal end portion 32 of the suction nozzle 18 comes into contact with the surface 88 of the workpiece 12 due to the depth of the hole 14, to thereby fail to suction the dust. As a result, even when the depth of the hole 14 varies, the distal end portion 32 of the suction nozzle 18 can be indirectly brought into contact with the surface 88 of the workpiece 12 via the tubular portion 161 to thereby close the hole 14.

Figure 15:
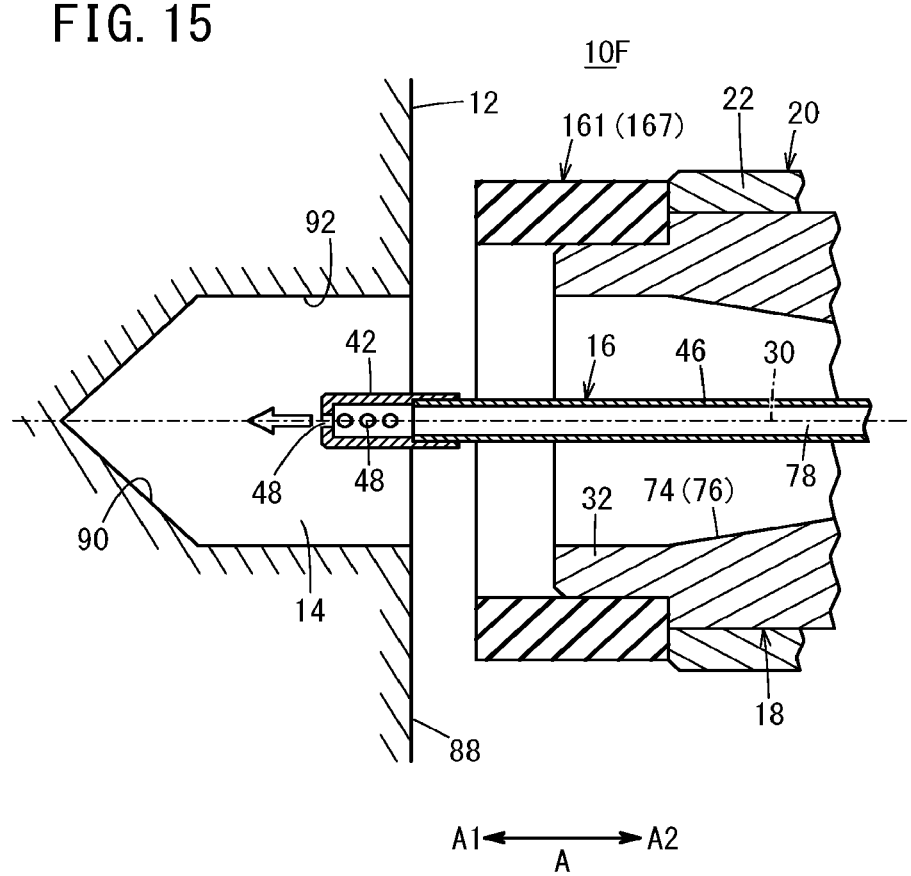
FIG. 15 is a partial sectional view of another structure of the sixth modification.

The example illustrated in FIG. 15 illustrates a case where an elastic body 167 disposed at the distal end portion 22 of the nozzle body 20 and the distal end portion 32 of the suction nozzle 18 serves as the tubular portion 161. Also in this case, as in the example illustrated in FIG. 14, it is possible to avoid a situation where the tip portion 42 of the jet nozzle 16 comes into contact with the bottom portion 90 of the hole 14 before the distal end portion 32 of the suction nozzle 18 comes into contact with the surface 88 of the workpiece 12 due to the depth of the hole 14, to thereby fail to suction the dust. Moreover, even when the depth of the hole 14 varies, the distal end portion 32 of the suction nozzle 18 can be indirectly brought into contact with the surface 88 of the workpiece 12 via the elastic body 167 to thereby block up the hole 14. The elastic body 167 is preferably composed of, for example, sponge rubber. In particular, in a case where closed-cell sponge rubber is used for the elastic body 167, sealing performance and cushioning performance on the surface 88 of the workpiece 12 are ensured, and the spring-back function is suitably achieved.

Figure 16:
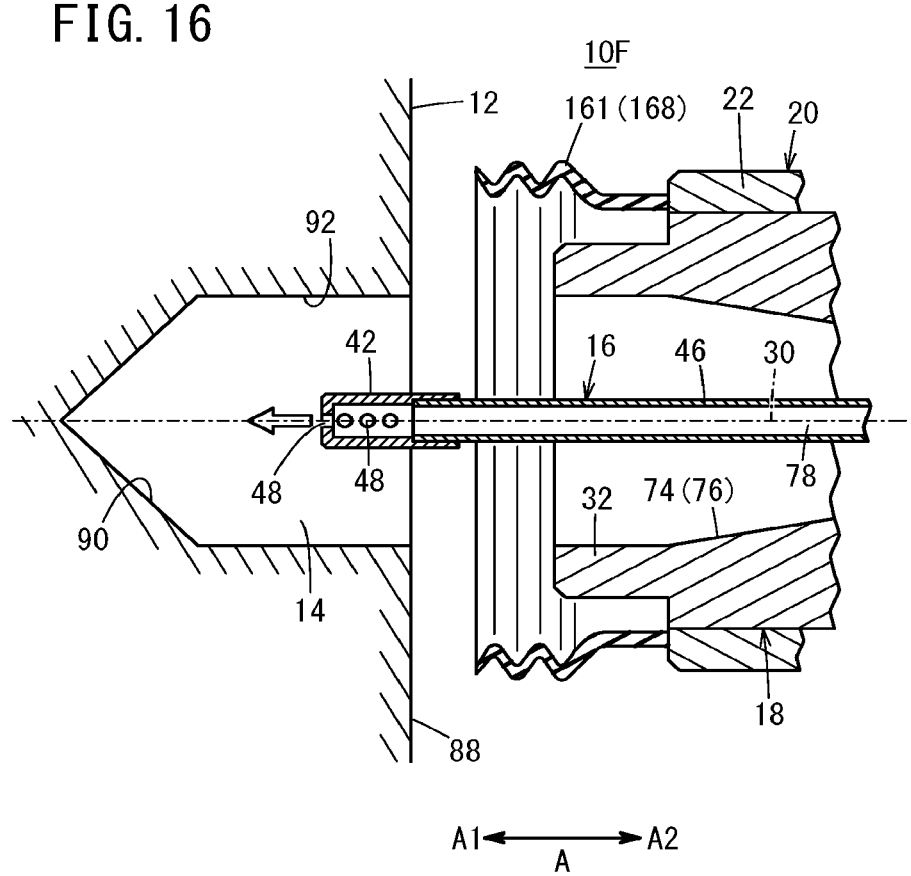
FIG. 16 is a partial sectional view of yet another structure of the sixth modification.

The example illustrated in FIG. 16 illustrates a case where a bellows 168 formed by shaping elastomer such as rubber and disposed at the distal end portion 22 of the nozzle body 20 serves as the tubular portion 161. Also in this case, as in the examples illustrated in FIGS. 14 and 15, it is possible to avoid a situation where the tip portion 42 of the jet nozzle 16 comes into contact with the bottom portion 90 of the hole 14 before the distal end portion 32 of the suction nozzle 18 comes into contact with the surface 88 of the workpiece 12 due to the depth of the hole 14, to thereby fail to suction the dust. Moreover, even when the depth of the hole 14 varies, the distal end portion 32 of the suction nozzle 18 can be indirectly brought into contact with the surface 88 of the workpiece 12 via the bellows 168 to thereby block up the hole 14. Furthermore, also in the example illustrated in FIG. 16, since the bellows 168 is made of elastomer such as rubber, sealing performance and cushioning performance on the surface 88 of the workpiece 12 are ensured, and the spring-back function is suitably achieved.

4.7 Seventh Modification

Figure 17:
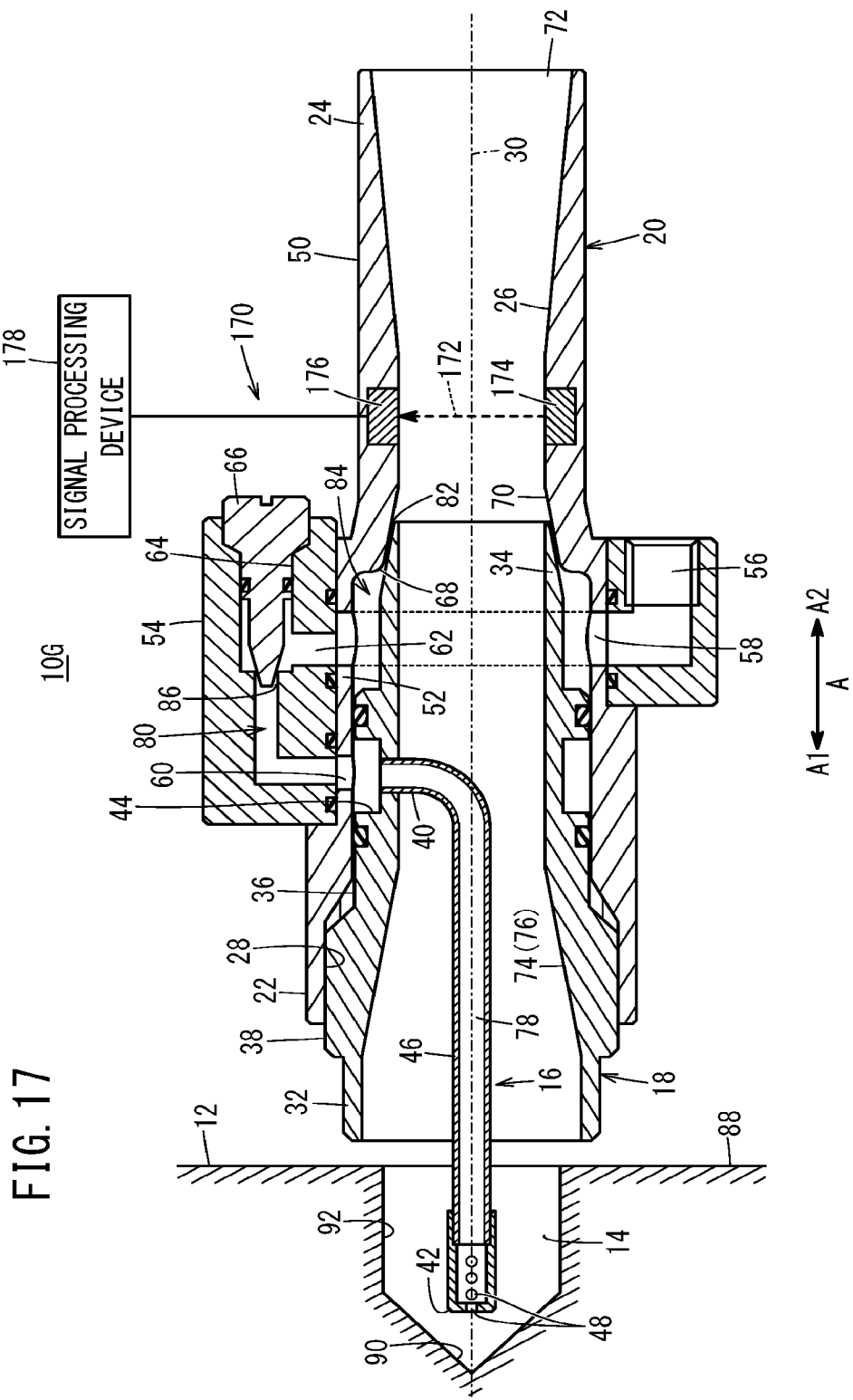
FIG. 17 is a cross-sectional view of a dust removing device of a seventh modification.

A dust removing device 10G of the seventh modification will now be described with reference to FIG. 17. The dust removing device 10G is different from the dust removing device 10 illustrated in FIGS. 1 and 2 in that a dust detecting unit 170 configured to detect passage of dust is provided on the nozzle body 20 on a side where the discharge channel 72 lies.

The dust detecting unit 170 includes, for example, a light emitting element 174 such as a light emitting diode for emitting light 172 in a radial direction, a photoelectric conversion element 176 for receiving the light 172 emitted by the light emitting element 174 and converting the received light 172 into an electrical signal, and a signal processing device 178 configured to determine whether dust has passed or not by processing the electrical signal output from the photoelectric conversion element 176. In this case, it can be easily checked that dust has been removed from the hole 14 when the signal processing device 178 determines that dust is not passing any longer.

Moreover, when a notification signal indicating that the dust removal is completed is output from the signal processing device 178, the fluid supply source can immediately stop supplying the compressed fluid to the dust removing device 10G, based on the notification signal. In this manner, since the dust detecting unit 170 quantitatively determines the completion of the dust removal, unnecessary consumption of the compressed fluid can be eliminated or reduced by using the determination result.

In the description above, the dust detecting unit 170 is an optical detection mechanism. The seventh modification is not limited to the above description, and it is possible to adopt any detecting means of any detection method as long as it can detect passage of dust.

4.8 Eighth Modification

Figure 18:
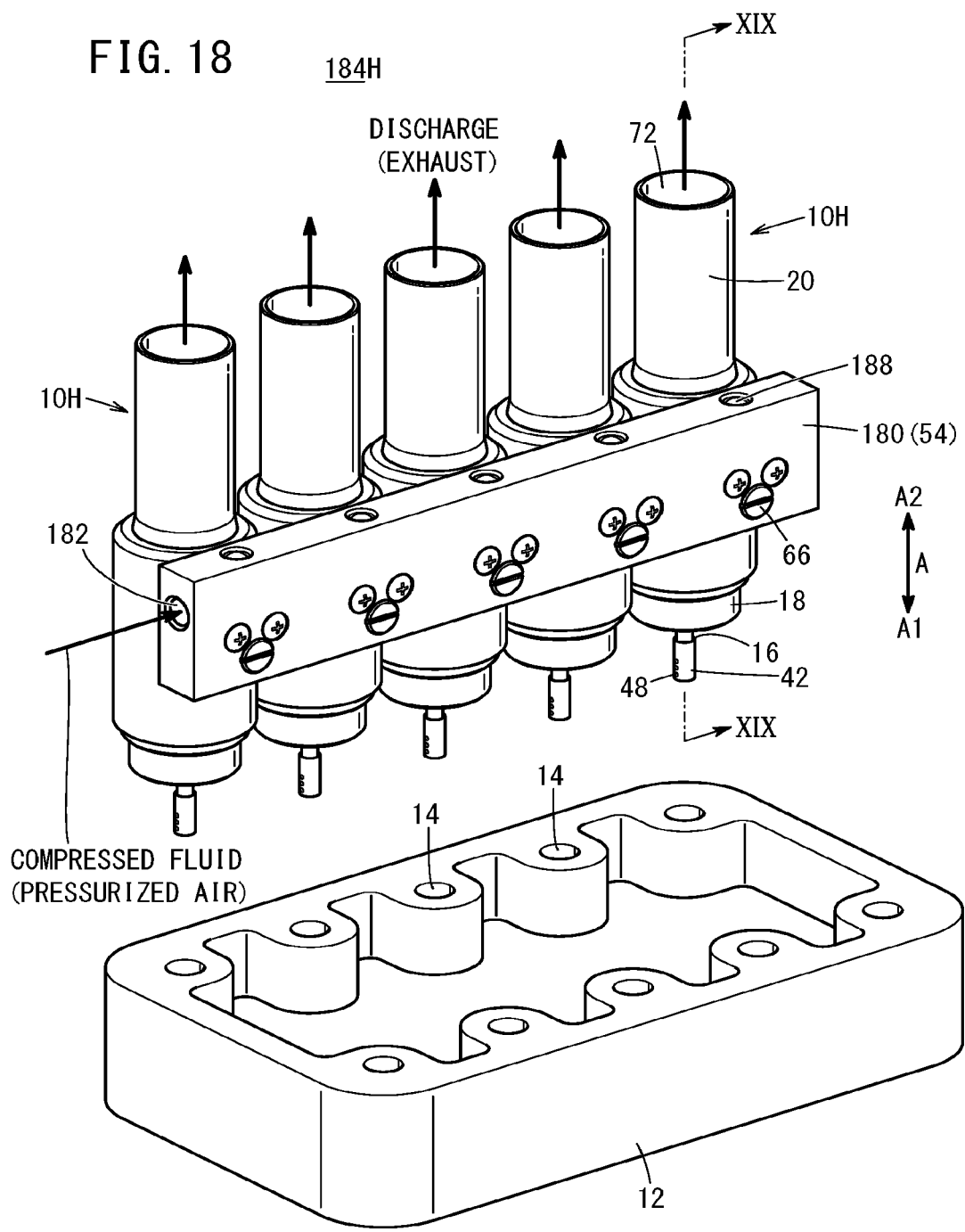
FIG. 18 is a perspective view of a dust removing system of an eighth modification.
Figure 19:
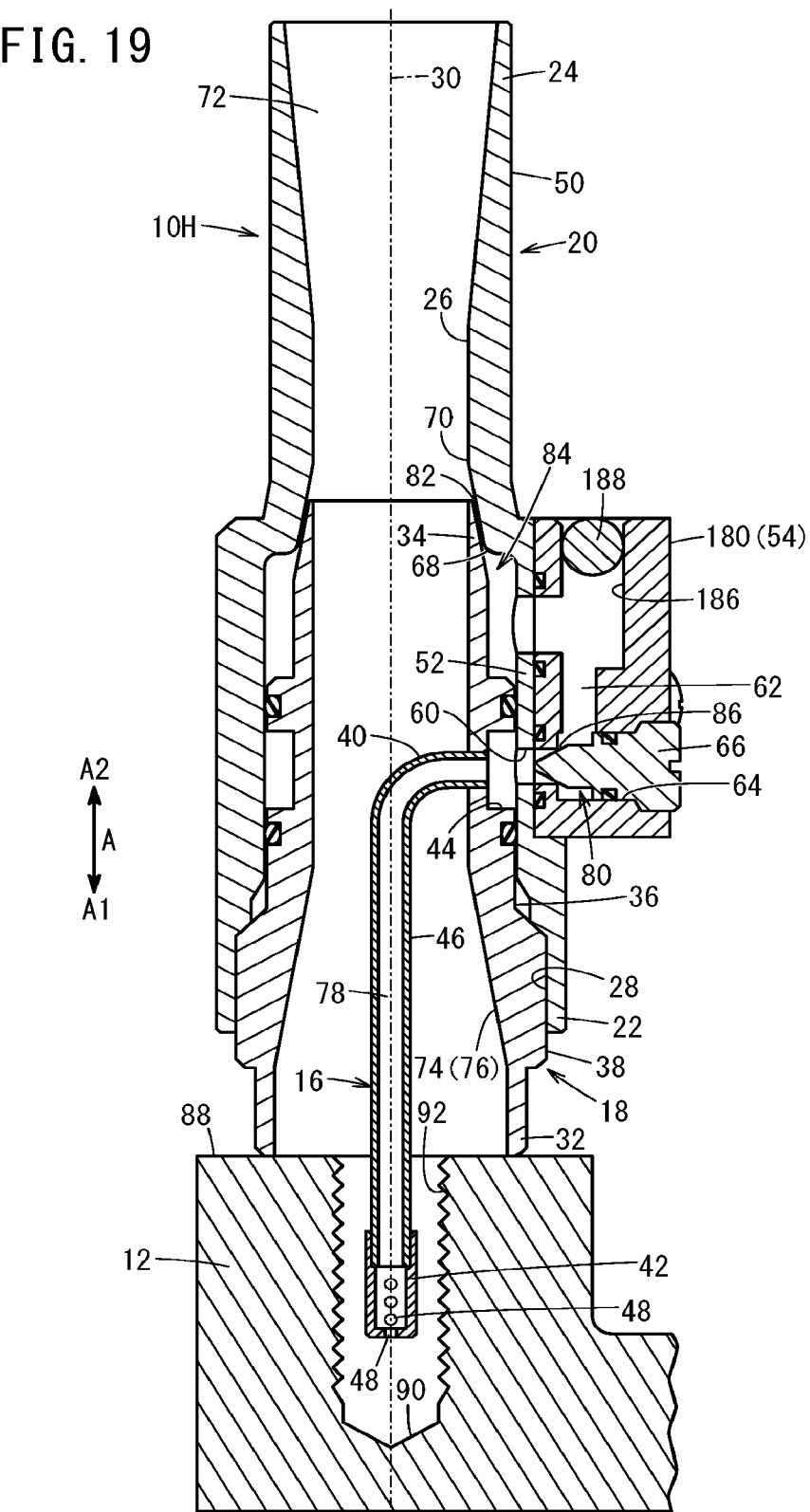
FIG. 19 is a cross-sectional view taken along line XIX-XIX in FIG. 18.

Dust removing devices 10H of the eighth modification will now be described with reference to FIGS. 18 and 19. In the eighth modification, a plurality of dust removing devices 10H having a structure substantially identical to the structure of the dust removing device 10 illustrated in FIGS. 1 and 2 are connected in a row to form a manifold structure. More specifically, as illustrated in FIGS. 18 and 19, the plurality of dust removing devices 10H are connected to a compressed fluid supply block 180 into which the compressed fluid supply parts 54 are integrated for common use, and a common supply port 182 for supplying compressed fluid (pressurized air) from an external fluid supply source is provided on a side surface of the compressed fluid supply block 180. Moreover, the needle screw 66 of each of the dust removing devices 10H is disposed in a radial direction of the corresponding dust removing device 10H. With this, a dust removing system 184H including the plurality of dust removing devices 10H is configured. As illustrated in FIG. 19, in the compressed fluid supply block 180, each of the channels 62 communicates with the outside via a hole 186 formed in the A2 direction. Each of the holes 186 is closed with a spherical body 188.

In this manner, in the eighth modification, the plurality of dust removing devices 10H are organized into a manifold structure, so that the compressed fluid is shared with the plural dust removing devices. Owing thereto, it is possible to downsize the dust removing system 184H including the dust removing devices 10H. As a result, as illustrated in FIG. 18, the jet nozzles 16 can be inserted into the respective holes 14 formed in the workpiece 12 with a relatively small pitch, to thereby simultaneously remove the dust adhering to the holes 14. Thus, in the eighth modification, dust can be efficiently removed from the workpiece 12 having the plurality of holes 14.

Moreover, also in the dust removing system 184H, the plurality of dust removing devices 10H each include the nozzle-body-side adjustment thread 28, the suction-nozzle-side adjustment thread 38, and the needle screw 66. Thus, the first compressed fluid can be ejected from the ejection ports 48 of the jet nozzles 16 after the jet nozzles 16 are inserted into the respective holes 14 and the suction nozzles 18 are brought into contact with the surface 88 of the workpiece 12 to thereby block up the holes 14 while vacuum suction is generated in advance by sequentially supplying compressed fluid to each supply port (inlet channel 56) in the corresponding dust removing device 10H and discharging the second compressed fluid. Also in this case, the dust can be prevented from scattering to the outside during the dust removal.

In this manner, also in the eighth modification, since the dust removing devices 10H each include the nozzle-body-side adjustment thread 28, the suction-nozzle-side adjustment thread 38, and the needle screw 66, the first compressed fluid and the second compressed fluid can be supplied at different times, that is, vacuum suction is caused in advance, and thereafter the tip portions 42 of the jet nozzles 16 are inserted into the holes 14 to eject the first compressed fluid.

4.9 Ninth Modification

Dust removing devices 10I and a dust removing system 184I of the ninth modification will now be described with reference to FIGS. 20 to 22. The ninth modification illustrates simultaneous removal of dust from inside the holes 14 in a case where the workpiece 12 with a complicated shape has the holes 14 at various positions.

Figure 20:
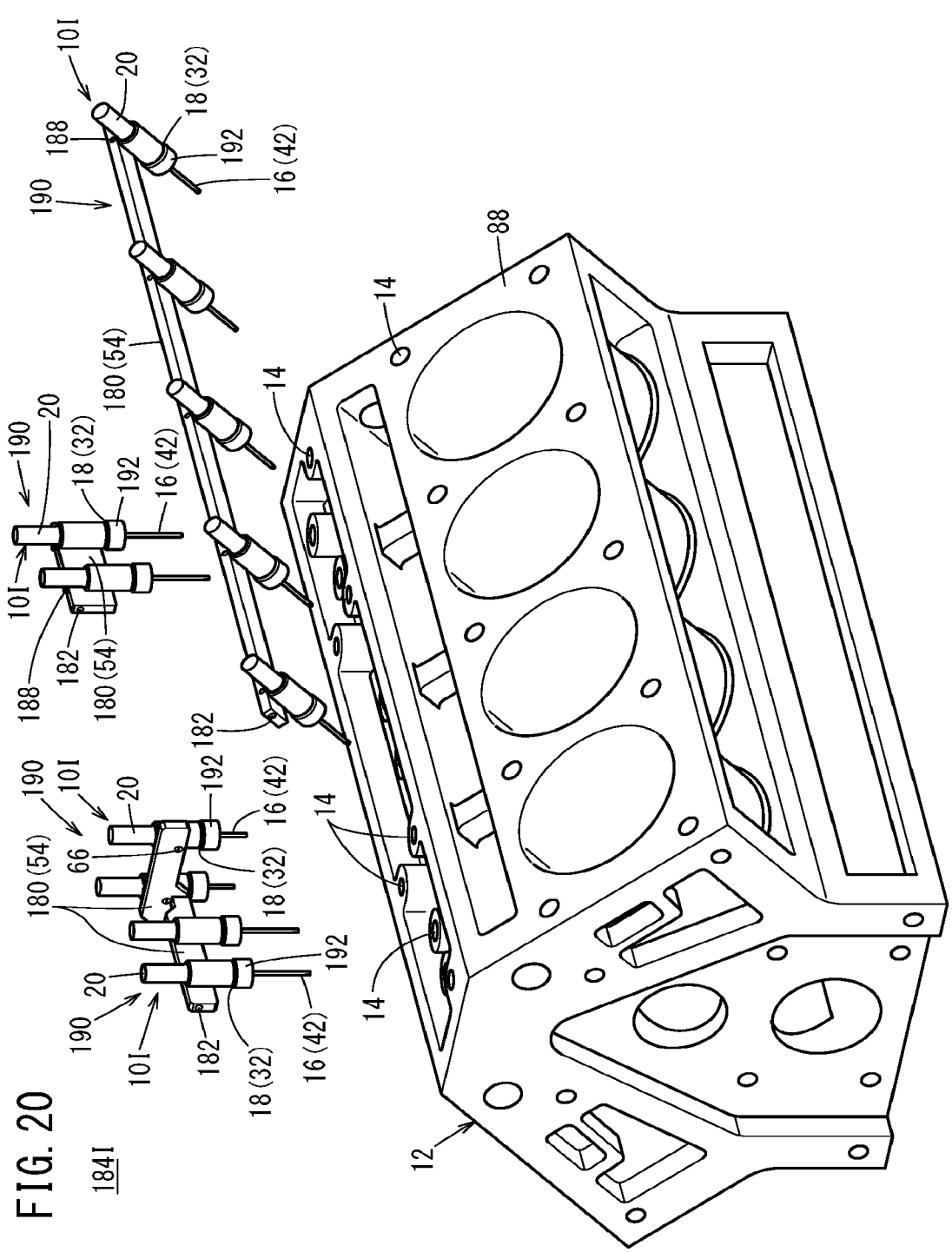
FIG. 20 is a perspective view of a dust removing system of a ninth modification.
Figure 21:
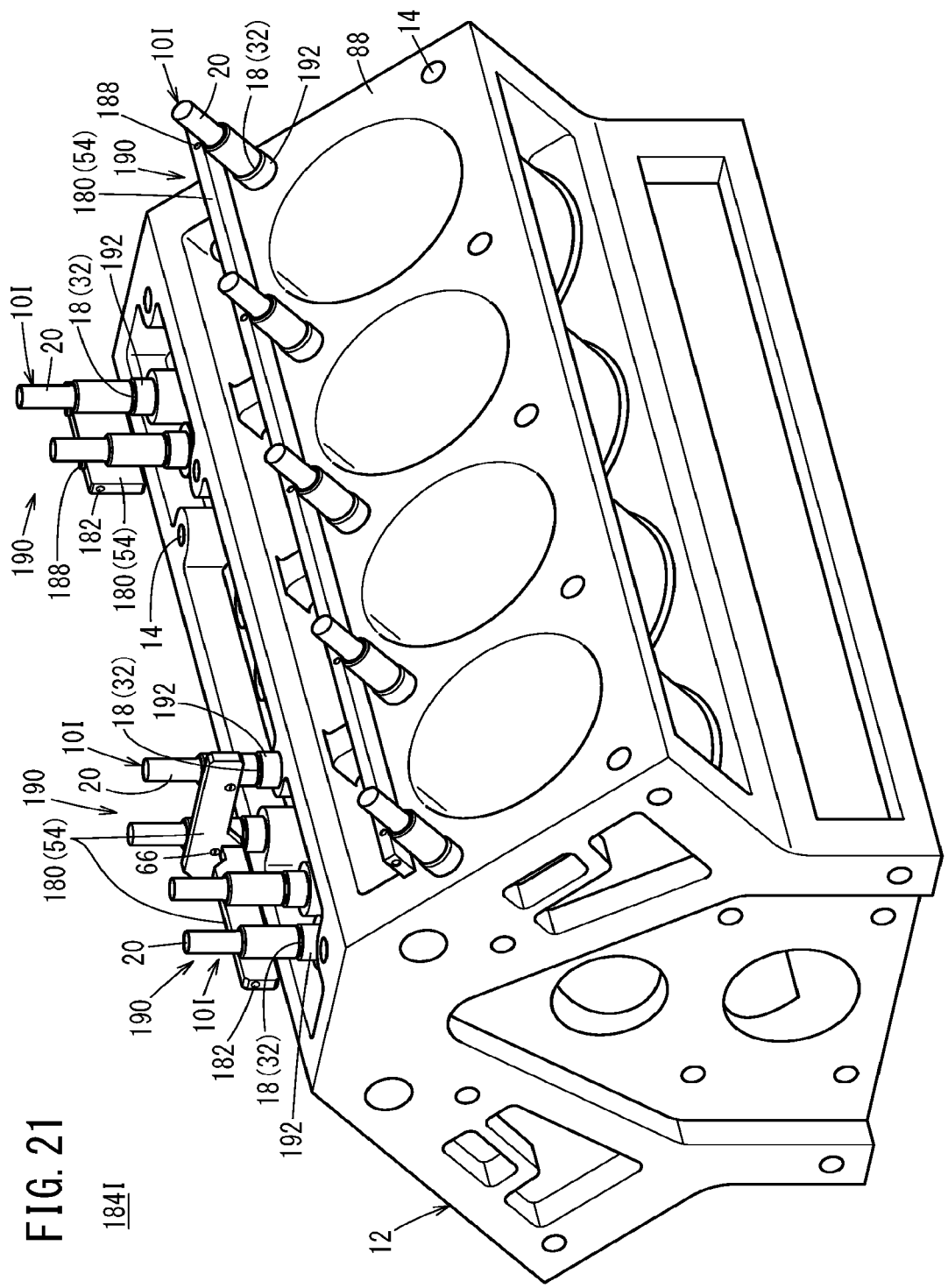
FIG. 21 is a perspective view illustrating a case where dust is simultaneously removed from holes in a workpiece.
Figure 22:
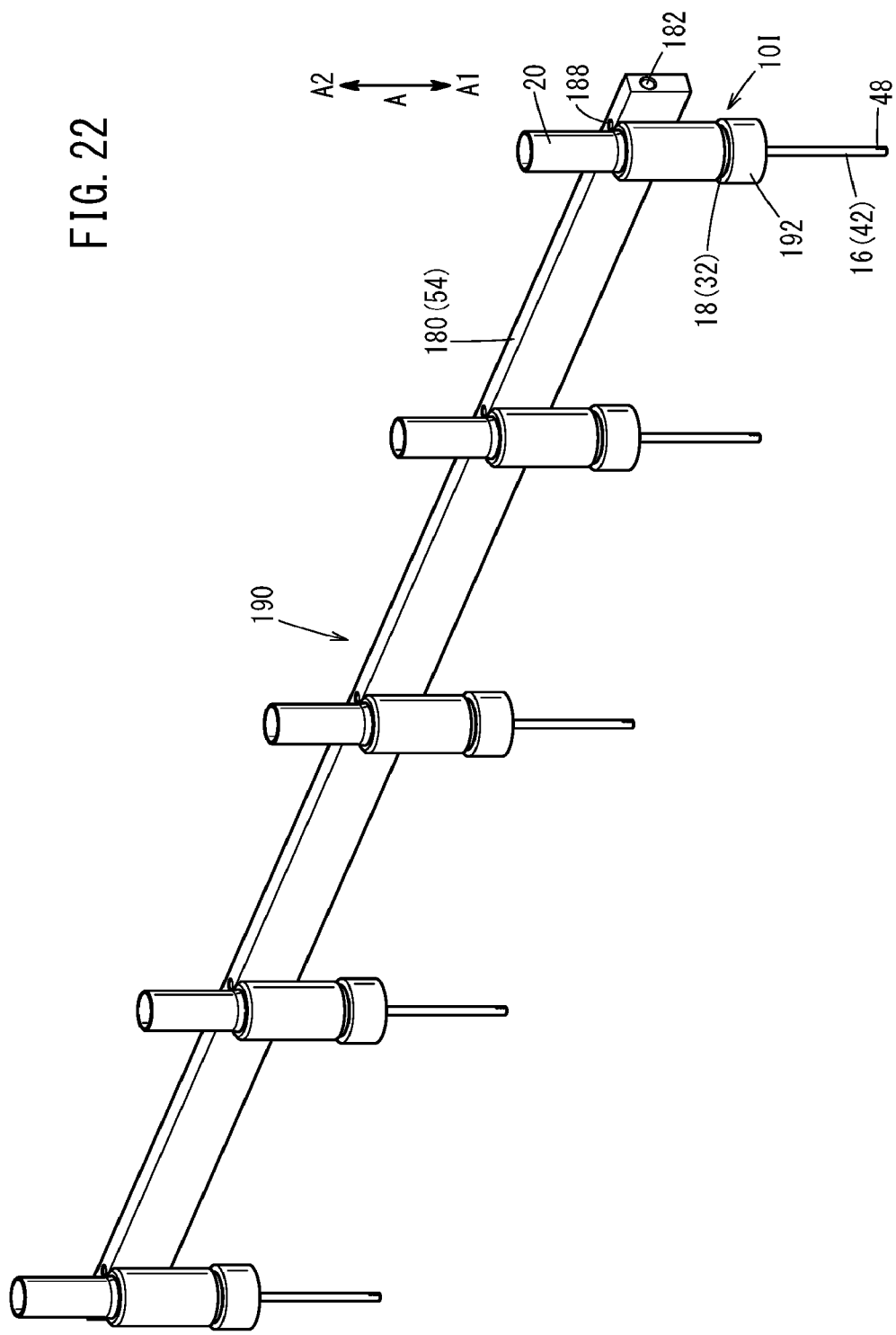
FIG. 22 is a perspective view illustrating how dust removing devices are secured to a compressed fluid supply block.

As illustrated in FIGS. 20 and 21, in the ninth modification, the workpiece 12 has the plurality of holes 14, which are blind holes, formed at different positions in different directions. More specifically, the plurality of holes 14 with the same diameter and depth are formed at regular intervals in, for example, the top surface and inclined surfaces connected with the top surface among the surfaces 88 of the workpiece 12.

The dust removing system 184I is different from the dust removing system 184H of the eighth modification (see FIGS. 18 and 19) in that the dust removing system 184I includes a plurality of manifold dust removing blocks 190 each including the plurality of dust removing devices 10I connected at regular intervals in the longitudinal direction of the compressed fluid supply block 180 in accordance with the holes 14. In this case, in each of the dust removing blocks 190, the plurality of dust removing devices 10I are attached to the corresponding compressed fluid supply block 180 such that the jet nozzles 16 are oriented in a direction orthogonal to the longitudinal direction of the compressed fluid supply block 180, as in the dust removing system 184H.

Moreover, in each of the dust removing devices 10I, a tubular blocking member 192 is attached to the distal end portion 32 of the suction nozzle 18. The blocking members 192 of the dust removing devices 10I have an identical length, and the jet nozzles 16 protrude by an identical length. In the dust removing system 184I, (the dust removing devices 10I of) the dust removing blocks 190 for removing dust are assigned in advance to respective groups of the holes 14.

Thus, for removing dust from the groups of holes 14 in the workpiece 12, the dust removing blocks 190 are moved respectively to the vicinities of the groups of holes 14 assigned thereto in advance, by using moving means such as robot arms (not illustrated) without interfering with each other, and thereafter the tip portions 42 of the jet nozzles 16 are inserted into the holes 14 to block up areas around the holes 14 or vicinities of the holes on the surface 88 by the blocking members 192. As a result, dust can be simultaneously removed from all the holes 14 by supplying compressed fluid from each of the compressed fluid supply blocks 180 to the corresponding dust removing devices 10I at the point in time when insertion of the jet nozzles 16 into all the holes 14 from which dust is to be removed is completed.

In this manner, in the ninth modification, the dust removing system 184I includes the plurality of dust removing blocks 190 each including the plurality of dust removing devices 10I connected by the corresponding compressed fluid supply block 180. Thus, in a case where the workpiece 12 has the plurality of holes 14, dust can be simultaneously removed from the holes 14 using the dust removing devices 10I by inserting the tip portions 42 of the jet nozzles 16 into the respective holes 14. This leads to an efficient dust removal.

In this case, in each of the dust removing blocks 190, the dust removing devices 10I are fixed at predetermined intervals in the longitudinal direction of the compressed fluid supply block 180 such that the jet nozzles 16 extend in the same direction as each other. Thus, in a case where the plurality of holes 14 are formed in an identical direction (for example, equal pitch) in the surface 88 of the workpiece 12, the tip portions 42 of the jet nozzles 16 of the dust removing devices 10I can be inserted in the respective holes 14 to thereby simultaneously remove dust, leading to a more efficient dust removal.

In addition, the suction nozzles 18 of the dust removing devices 10I are provided with the blocking members 192 configured to block areas around the holes 14 on the surface 88 of the workpiece 12 when the tip portions 42 of the jet nozzles 16 are inserted into the holes 14. Owing thereto, it is possible to remove dust without leaking the dust and the first compressed fluid to the outside during the dust removal.

4.10 Tenth Modification

Dust removing devices 10J and a dust removing system 184J of the tenth modification will now be described with reference to FIG. 23. The tenth modification is intended to provide a structure capable of simultaneous removal of dust from inside the holes 14 in a case where the workpiece 12 has the plurality of holes 14 with different depths. Thus, the dust removing devices 10J and the dust removing system 184J are different from those in the ninth modification in the following points.

Figure 23:
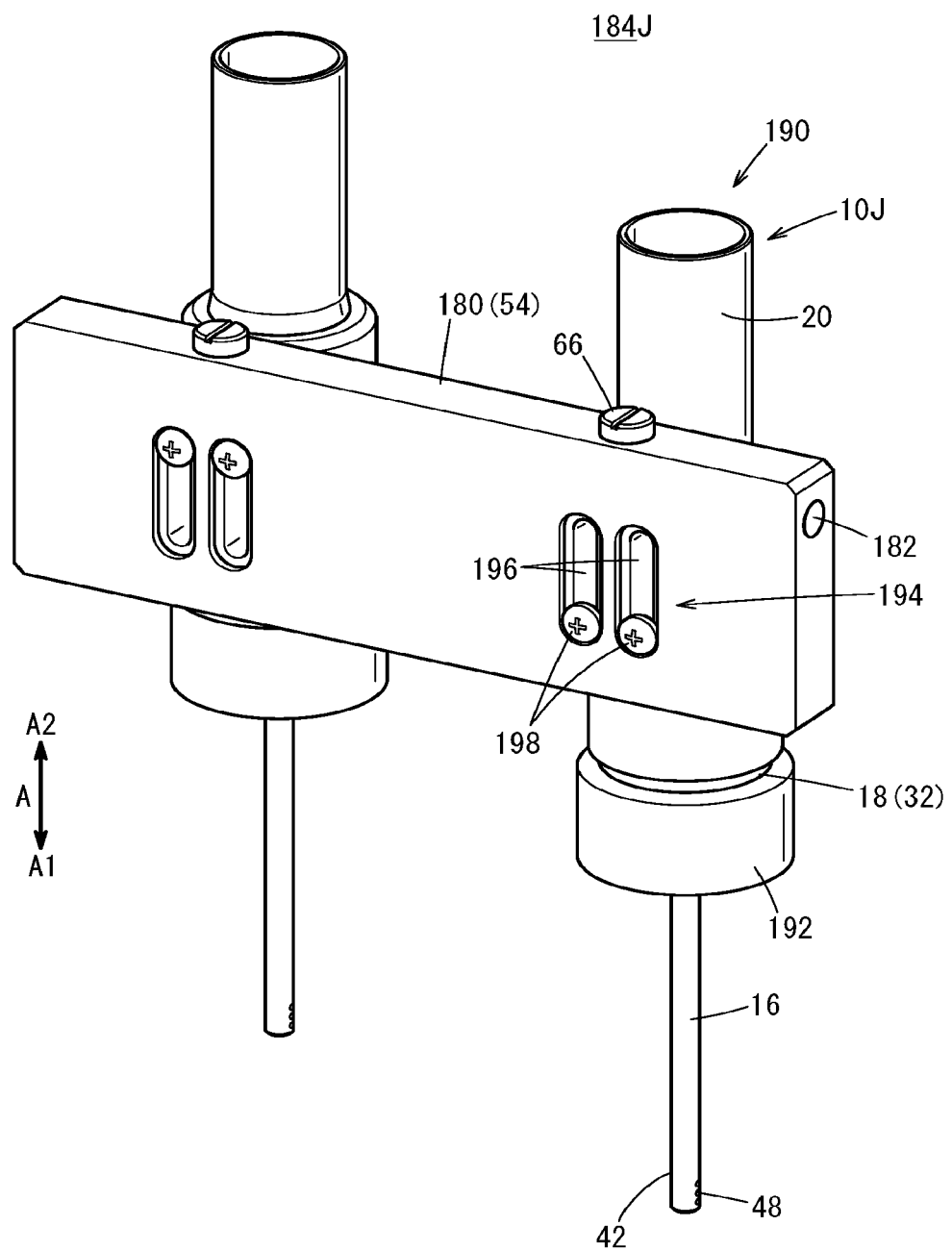
FIG. 23 is a perspective view of a dust removing system of a tenth modification.

First, as illustrated in FIG. 23, attachment position adjustment mechanisms 194 are provided to adjust the attachment heights (attachment positions) of the dust removing devices 10J with respect to the compressed fluid supply block 180. In the compressed fluid supply block 180, one attachment position adjustment mechanisms 194 is provided for each of the dust removing devices 10J. The attachment position adjustment mechanism 194 includes two elongated circular adjustment holes 196 extending in the A direction and facing the dust removing device 10J, and position adjustment screws 198 configured to fix the dust removing device 10J to the compressed fluid supply block 180 by being inserted into the respective adjustment holes 196 and screw-engaged into the dust removing device 10J.

Since the adjustment holes 196 extend in the A direction as described above, each of the dust removing devices 10J can be set at a desired height within the longitudinal range of the adjustment hole 196 in the A direction and then fixed to the compressed fluid supply block 180 by inserting the position adjustment screws 198 in the adjustment holes 196 at the desired height and screw-engaging the screws into the dust removing device 10J. Since the attachment position adjustment mechanisms 194 are provided on the compressed fluid supply block 180 so as to face the dust removing devices 10J in this manner, the needle screws 66 are disposed on the top surface of the compressed fluid supply block 180.

In this manner, in the tenth modification, dust is simultaneously removed from the holes 14 while the tip portions 42 of the jet nozzles 16 are inserted in the respective holes 14 as in the ninth modification, so that an efficient dust removal can be achieved. Moreover, in the tenth modification, in the case where the workpiece 12 has the plurality of holes 14 with different depths, by adjusting the attachment position of each of the dust removing devices 10J in the compressed fluid supply block 180 using the corresponding attachment position adjustment mechanism 194, the tip portions 42 of the jet nozzles 16 can be inserted into the holes 14 to appropriate depths to remove the dust.

4.11 Eleventh Modification

Dust removing devices 10K and a dust removing system 184K of the eleventh modification will now be described with reference to FIGS. 24 to 26. The eleventh modification is intended to simultaneously remove dust from inside the holes 14 in a case where the workpiece 12 has the holes 14 with different diameters and depths at various height positions (formation positions).

Figure 24:
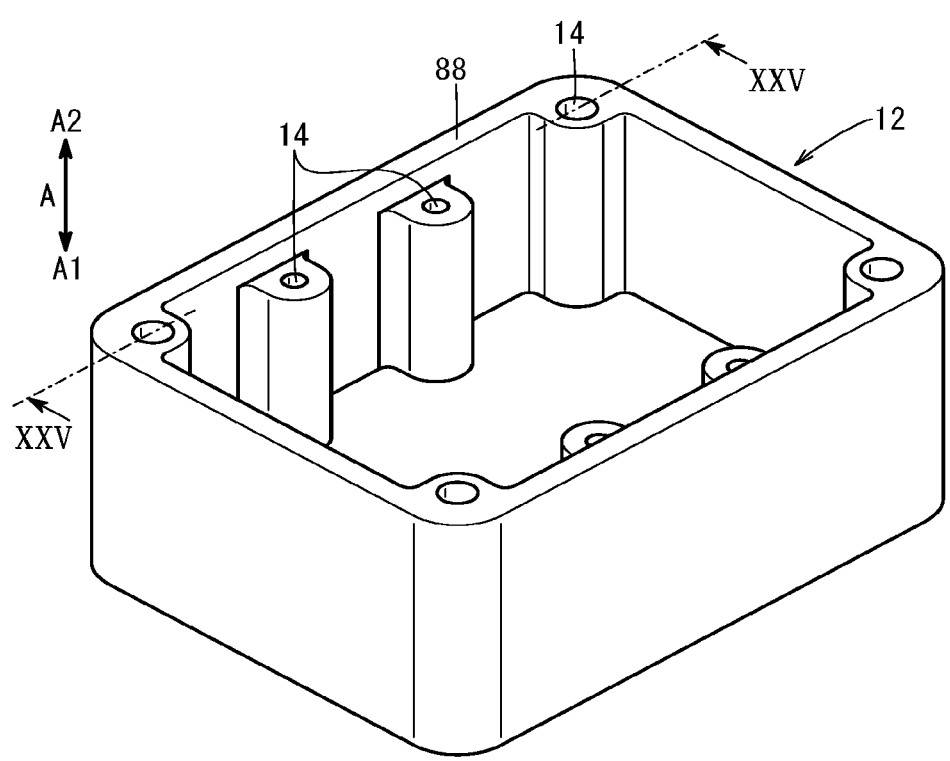
FIG. 24 is a perspective view of a workpiece from which dust is to be removed using a dust removing system of an eleventh modification.
Figure 25:
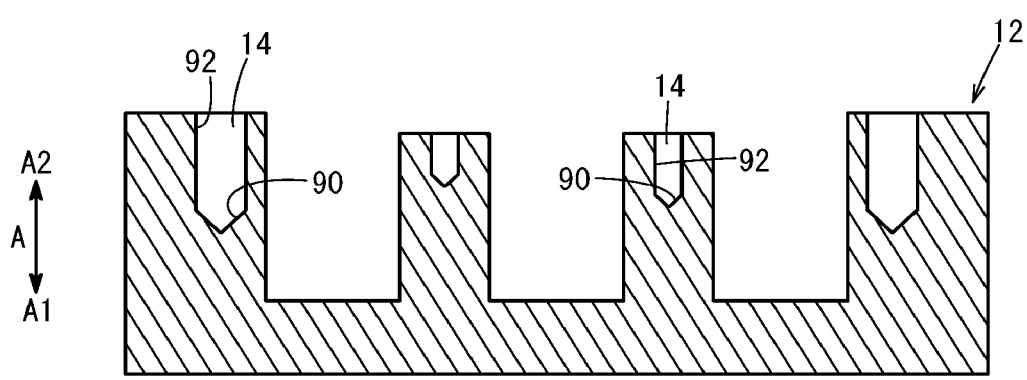
FIG. 25 is a cross-sectional view taken along line XXV-XXV in FIG. 24.

FIGS. 24 and 25 are a perspective view and a cross-sectional view, respectively, illustrating an example of the workpiece 12. The workpiece 12 is a box-shaped case without an upper lid and has the plurality of holes 14 with different diameters and depths formed in an upper end portion at different positions. In the eleventh modification, the dust removing devices 10K and the dust removing system 184K are different from those in the eighth to tenth modifications (see FIGS. 18 to 23) in the following points.

First, as in the first modification (see FIGS. 3A to 8C), the tip portions 42 of the jet nozzles 16 are replaceable from the nozzle body portions 46. That is, in the eleventh modification, the tip portions 42 can be appropriately replaced according to the varying diameters and depths of the holes 14, the types of dust, and the like.

Figure 26:
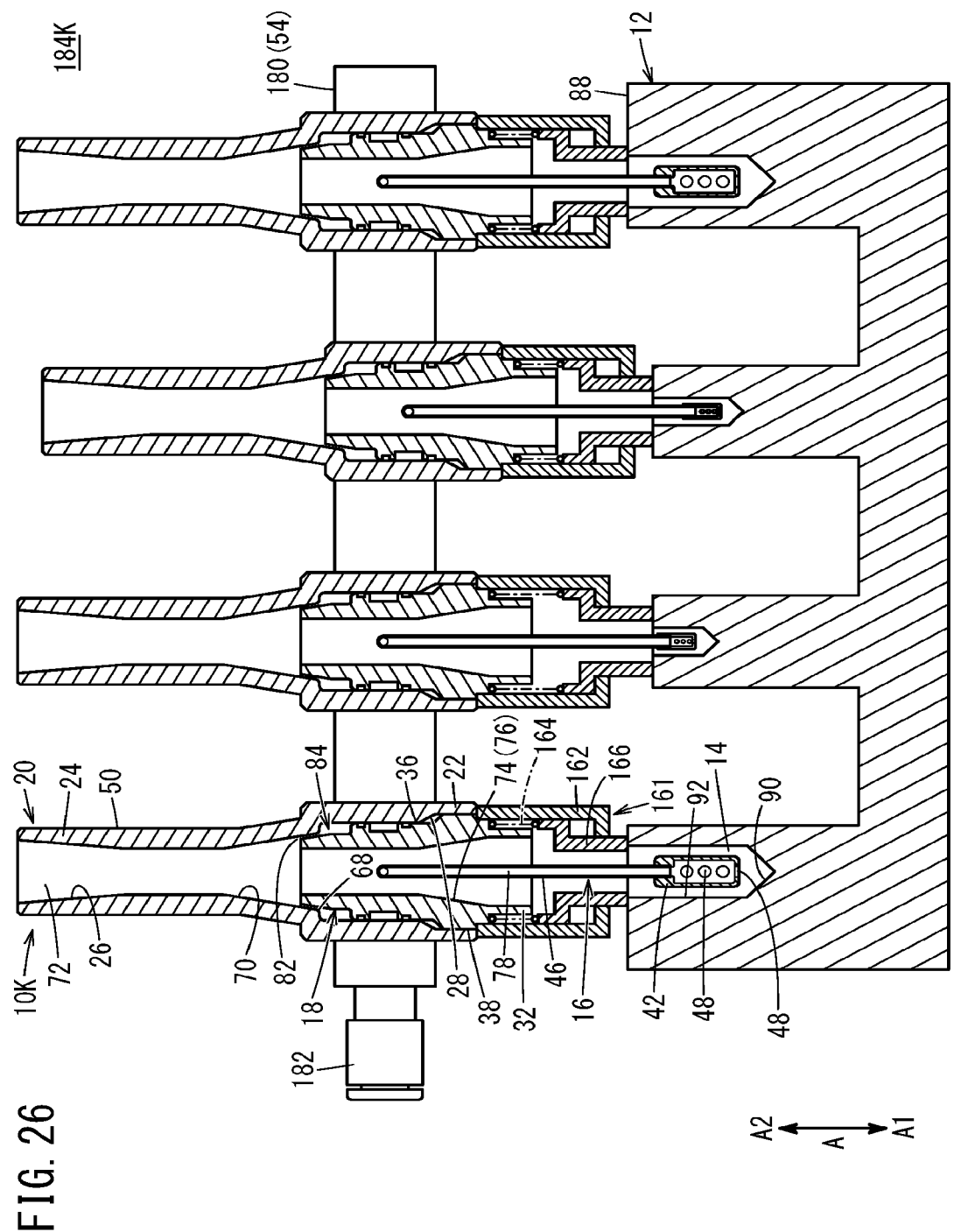
FIG. 26 is a cross-sectional view of the dust removing system of the eleventh modification.

As illustrated in FIG. 26, the dust removing devices 10K have a structure in common with each other except for the tip portions 42. In this case, the tip portions 42 are set such that the diameters of the tip portions 42 vary according to the diameters of the holes, that the lengths of the tip portions 42 vary according to the depths of the holes 14, and that the sizes of the ejection ports 48 vary according to the volumes inside the holes 14, the types of dust, and the like.

Moreover, as in the sixth modification (see FIGS. 14 to 16), the tubular portions 161 are attached to the nozzle bodies 20 and the suction nozzles 18. In this case, when the jet nozzles 16 are inserted into the holes 14, the tubular portions 161 come into contact with the surface 88 of the workpiece 12 before the tip portions 42 of the jet nozzles 16 come into contact with the bottom portions 90 of the holes 14. Note that FIG. 26 illustrates a case where the tubular portions 161 illustrated in FIG. 14 are attached to the dust removing devices 10K.

In the eleventh modification, as illustrated in FIG. 26, in the case where the sizes and depths of the plurality of holes 14, the types of dust, and the like vary, the tip portions 42 of the jet nozzles 16 are made replaceable as in the first modification (see FIGS. 3A to 8C), and the appropriate tip portions 42 are attached to the jet nozzles 16. Thus, the tip portions 42 of the jet nozzles 16 can be inserted into the holes 14 to appropriate depths to remove dust.

Moreover, in the eleventh modification, as illustrated in FIG. 26, even in the case where the sizes, depths, and formation positions of the plurality of holes 14 vary, areas around the holes 14 on the surface 88 of the workpiece 12 can be appropriately blocked up with the tubular portions 161 before the tip portions 42 of the jet nozzles 16 come into contact with the bottom portions 90 of the holes 14.

With this, in the eleventh modification, dust is simultaneously removed from the holes 14 while the tip portions 42 of the jet nozzles 16 are inserted in the respective holes 14, whereby an efficient dust removal can be achieved. Moreover, in the case where the workpiece 12 has the plurality of holes 14 with different diameters, depths, and formation positions, dust can be efficiently removed without leakage of the dust and the first compressed fluid to the outside, by inserting the tip portions 42 of the jet nozzles 16 to appropriate depths and blocking up areas around the holes 14 by the tubular portions 161.

Furthermore, the tip portions 42 are replaceable also in the eleventh modification. Thus, the user friendliness and the maintainability of the jet nozzles 16 as well are improved by attaching the appropriate tip portions 42 to the jet nozzles 16 according to the sizes, depths, and formation positions of the holes 14, the types of dust, and the like.

The present invention is not limited to the above-described embodiment, and various modifications can be made thereto without departing from the scope of the present invention as a matter of course.

The invention claimed is:

1. A dust removing device configured to eject compressed fluid from a jet nozzle into a hole of an object and suction dust adhering to the hole and the compressed fluid by using a suction nozzle enclosing the jet nozzle, in a state that the jet nozzle is inserted into the hole and the hole is closed by the suction nozzle, the dust removing device comprising:

a hollow nozzle body to which the jet nozzle and the suction nozzle are connected and through which the dust and the compressed fluid suctioned by the suction nozzle are discharged to an outside;

an ejection volume adjustment part configured to adjust a flow rate of the compressed fluid ejected from the jet nozzle; and a suction volume adjustment part configured to adjust an amount of the dust and an amount of the compressed fluid suctioned by the suction nozzle, wherein:

the nozzle body includes a first fluid supply route for supplying part of the compressed fluid supplied from the outside as first compressed fluid to the jet nozzle, wherein the jet nozzle is configured to eject the part of the compressed fluid, and a second fluid supply route for discharging another part of the compressed fluid supplied from the outside as second compressed fluid toward a downstream side in a discharge direction;

the discharging of the second compressed fluid toward the downstream side in the discharge direction causes the dust and the first compressed fluid to be discharged to the outside via the suction nozzle and the nozzle body;

the ejection volume adjustment part is configured to adjust a flow channel area of the first fluid supply route to thereby adjust a flow rate of the first compressed fluid ejected from the jet nozzle;

the suction volume adjustment part is configured to adjust a flow channel area of the second fluid supply route to thereby adjust a flow rate of the second compressed fluid discharged on the downstream side in the discharge direction, whereby the amount of the dust and the amount of the compressed fluid suctioned by the suction nozzle are adjusted;

a base end portion of the jet nozzle is secured to the suction nozzle;

the suction nozzle is attached to an inner circumferential surface of the nozzle body so as to be movable in an axial direction of the nozzle body;

the second fluid supply route is a gap formed between a base end portion of the suction nozzle and the inner circumferential surface of the nozzle body; and the suction volume adjustment part is configured to adjust an opening degree of the gap by moving the suction nozzle in the axial direction relative to the inner circumferential surface of the nozzle body to thereby adjust the flow rate of the second compressed fluid, wherein the ejection volume adjustment part is a needle screw provided on the nozzle body to narrow down the first fluid supply route, and the suction volume adjustment part comprises an adjustment thread formed in an outer circumferential surface of the suction nozzle and an adjustment thread fon led in the inner circumferential surface of the nozzle body, the adjustment threads being configured to be screw-engaged with each other.

2. The dust removing device according to claim 1, wherein:
an ejection port through which the first compressed fluid is ejected is formed in at least one of an outer circumferential surface and a distal end surface of a tip portion of the jet nozzle: and
the tip portion of the jet nozzle is replaceable.

3. The dust removing device according to claim 2, wherein the ejection port extends in one of an axial direction of the jet nozzle, a radial direction of the jet nozzle, and a direction inclined at a predetermined angle with respect to the radial direction.

4. The dust removing device according to claim 3, wherein:
the tip portion of the jet nozzle includes an inner cylindrical part connected to the jet nozzle and an outer cylindrical part attached onto the inner cylindrical part so as to be rotatable about a central axis of the jet nozzle;
the inner cylindrical part has an inner ejection port extending in the radial direction; and
the outer cylindrical part has an outer ejection port inclined at a predetermined angle with respect to the radial direction.

5. The dust removing device according to claim 1, wherein:
the suction nozzle includes a tubular mounting portion attached to the nozzle body, and a tubular attachment portion detachable from the tubular mounting portion and to which a base end portion of the jet nozzle is attached;
a protrusion is formed on an outer circumferential surface of the tubular attachment portion; and
the tubular mounting portion is provided with a locking part protruding inward of the tubular mounting portion to lock the protrusion.

6. The dust removing device according to claim 1, further comprising:
a first tubular body attached to a distal end portion of the suction nozzle so as to be movable along an outer circumferential surface of the suction nozzle;
a first spring member interposed between the nozzle body and the first tubular body; and
a first plunger provided on the nozzle body and extending in the axial direction of the nozzle body toward the first tubular body; wherein:
the nozzle body further includes an inlet channel through which the compressed fluid supplied from the outside is supplied to the first fluid supply route and the second fluid supply route;
a first seal body configured to open and close the inlet channel is attached to a base end portion of the first plunger;
the first seal body is configured to open the inlet channel due to displacement of the first plunger in the axial direction as the nozzle body moves toward the object when the first tubular body comes into contact with the object and the nozzle body moves toward the object against an elastic force of the first spring member to thereby bring the first plunger into abutment on the first tubular body; and
the first seal body is configured to close the inlet channel due to displacement of the first plunger in the axial direction when the first tubular body is separated from the object and the nozzle body is relatively separated from the first tubular body by the elastic force of the first spring member.

7. The dust removing device according to claim 1, wherein:
a tip of the jet nozzle is provided with an ejection port for ejecting the first compressed fluid and a valve element configured to close the ejection port; and
the jet nozzle is inserted into the hole and the valve element is configured to come into contact with a bottom portion of the hole to thereby displace the valve element in an axial direction of the jet nozzle, whereby the ejection port is opened, and the first compressed fluid is ejected from the ejection port.

8. The dust removing device according to claim 1, further comprising:
a second tubular body attached to a distal end portion of the suction nozzle so as to be movable along an outer circumferential surface of the suction nozzle;
a second spring member interposed between the nozzle body and the second tubular body; and
a second plunger provided on the nozzle body and extending in the axial direction of the nozzle body toward the second tubular body; wherein:
a second seal body configured to open and close the first fluid supply route is attached to a base end portion of the second plunger;
the second seal body is configured to open the first fluid supply route due to displacement of the second plunger in the axial direction as the nozzle body moves toward the object, when the second tubular body comes into contact with the object and the nozzle body moves toward the object against an elastic force of the second spring member to thereby bring the second plunger into abutment on the second tubular body; and
the second seal body is configured to close the first fluid supply route due to displacement of the second plunger in the axial direction as the nozzle body moves toward the object, when the second tubular body is separated from the object and the nozzle body is relatively separated from the second tubular body by the elastic force of the second spring member.

9. The dust removing device according to claim 1, further comprising:
a tubular portion protruding from at least one of the nozzle body and the suction nozzle toward the object and configured to come into contact with a surface of the object before the jet nozzle comes into contact with a bottom portion of the hole when the jet nozzle is inserted into the hole.

10. The dust removing device according to claim 9, wherein the tubular portion returns to a position prior to the contact with the object due to a spring-back function, when the tubular portion is separated from the object.

11. The dust removing device according to claim 1, further comprising:
a dust detecting unit configured to detect passage of the dust inside the nozzle body.

12. The dust removing device according to claim 1, further comprising:
a blocking member replaceably attached to the suction nozzle and configured to block up an area around the hole on a surface of the object when the jet nozzle is inserted into the hole.

13. The dust removing system according to claim 1, further comprising a recess formed in the suction nozzle, wherein the recess has a length in the axial direction of the nozzle body such that the recess is able to fluidically communicate with a channel having a fixed position with respect to the hollow nozzle body and with the base end portion of the jet nozzle, for plural positions of movement of the suction nozzle in the axial direction of the hollow nozzle body, to adjust the flow channel area of the second fluid supply route.

14. A dust removing system comprising:
- a plurality of the dust removing devices according to claim 1; and
- a compressed fluid supply block configured to connect and secure the dust removing devices and to supply the compressed fluid to the dust removing devices.

15. The dust removing systems according to claim 14, wherein the dust removing devices are secured at predetermined intervals in a longitudinal direction of the compressed fluid supply block so that the jet nozzles extend in a same direction as each other.

16. The dust removing system according to claim 14, wherein, in the compressed fluid supply block, each of the dust removing devices is provided with an attachment position adjustment mechanism configured to adjust an attachment position of the corresponding dust removing device.

* * * * *